(12) United States Patent (10) Patent No.: US 12,691,730 B2

Huerth et al. (45) Date of Patent: Jul. 28, 2026

(54) REFRIGERATED CARGO VEHICLE WITH ALTERNATOR DRIVEN REFRIGERATION SYSTEM

(71) Applicants: Dustin R. Huerth, Rice Lake, WI (US); Aaron A. Strand, Rice Lake, WI (US); Gerald L. Larson, Grand Haven, MI (US); Lannah M. Schulz, Cameron, WI (US)

(72) Inventors: Dustin R. Huerth, Rice Lake, WI (US); Aaron A. Strand, Rice Lake, WI (US); Gerald L. Larson, Grand Haven, MI (US); Lannah M. Schulz, Cameron, WI (US)

(73) Assignee: Johnson Truck Bodies, LLC, Rice Lake, WI (US)

( * ) Notice: Subject to any disclaimer, the term of this patent is extended or adjusted under 35 U.S.C. 154(b) by 496 days.

(21) Appl. No.: 18/115,594

(22) Filed: Feb. 28, 2023

(65) Prior Publication Data

US 2024/0286460 A1 Aug. 29, 2024

(51) Int. Cl.
| | |
|---|---|
| *B60H 1/32* | (2006.01) |
| *B60H 1/00* | (2006.01) |
| *B60K 16/00* | (2020.01) |
| *B60L 1/00* | (2006.01) |
| *B60P 3/20* | (2006.01) |

(52) U.S. Cl.
CPC ....... *B60H 1/3232* (2013.01); *B60H 1/00428* (2013.01); *B60L 1/003* (2013.01); *B60P 3/20* (2013.01); *B60H 2001/3286* (2013.01); *B60K 2016/003* (2013.01); *B60L 2210/14* (2013.01); *B60L 2210/30* (2013.01)

(58) Field of Classification Search
CPC . B60H 1/3232; B60H 1/00014; F25D 11/003; B60L 2210/10; B60L 2210/12
See application file for complete search history.

(56) References Cited

U.S. PATENT DOCUMENTS

| | | | |
|---|---|---|---|
| 2018/0370383 A1* | 12/2018 | Schumacher | ......... B60L 3/0061 |
| 2021/0070135 A1* | 3/2021 | Andrade Dias | ....... H02J 7/0024 |
| 2023/0014254 A1* | 1/2023 | Conneely | ............ B60H 1/3232 |
| 2023/0211646 A1* | 7/2023 | She | ........................ H02J 1/082 |
| | | | 165/202 |

* cited by examiner

*Primary Examiner* — Elizabeth J Martin

(74) *Attorney, Agent, or Firm* — Nelson Mullins Riley & Scarborough LLP

(57) ABSTRACT

A refrigerated cargo vehicle has a refrigerated enclosure and a refrigeration system that delivers a refrigerated air flow to the enclosure. The refrigeration system includes a compressor that has a voltage rating higher than the electric potential output of an alternator driven by an engine of the refrigerated cargo vehicle. A DC-to-DC power converter is disposed electrically between the alternator and the compressor so that the power converter receives electric current from the alternator at a first electric potential and outputs a second electric current to the compressor at a second electric potential higher than the first electric potential.

16 Claims, 13 Drawing Sheets

REFRIGERATED CARGO VEHICLE WITH ALTERNATOR DRIVEN REFRIGERATION SYSTEM

BACKGROUND

Various apparatus and methods have been previously utilized for cooling air within a cargo space of a commercial wheeled vehicle. For example, refrigerated commercial vehicles have utilized cold plates, i.e., containers installed in the vehicle's refrigerated compartment that are filled with a liquid having a defined freezing, or eutectic, temperature. The liquid is brought to a frozen state prior to the vehicle's departure for a delivery route. As the route progresses, the frozen media absorbs heat as it is maintained in its eutectic condition. Such systems may be equipped with a vehicle-installed refrigeration unit operated by a connection to shore power to bring the media to the initial frozen state. Being operated from shore power, however, the refrigeration system is not operated while the vehicle is in motion. Cold plates for use in commercial vehicles are available from the Dole Refrigerating Company of Lewisburg, TN. Applicant's U.S. Pat. No. 9,126,544 and published application 2012/005518 are incorporated by reference herein.

It is also known for a commercial refrigerated cargo vehicle to have a refrigeration system driven directly by the vehicle engine. Generally, the vehicle has a cab in the front that defines an engine bay in which the vehicle engine is disposed. The refrigeration system includes a closed loop refrigerant path made of refrigerant tubing extending between a compressor and a condenser coil, between the condenser coil and an evaporator coil via an expansion device, and then from the evaporator coil back to the compressor, so that the compressor pumps refrigerant through the closed loop refrigerant path. The condenser coil is disposed on an external wall (such as the front wall or roof) of the cargo enclosure on the vehicle chassis rearward of the cab. A fan proximate the condenser coil moves ambient air over the condenser coil to remove heat from refrigerant flowing through the coil. The evaporator coil is disposed within the interior volume of the cargo enclosure, so that the refrigerant tubing from the condenser to the evaporator coil passes through a cargo enclosure wall and passes through an expansion valve upstream of the evaporator that reduces the refrigerant pressure. A fan proximate the evaporator coil within the cargo volume moves air within the volume over the evaporator coil, contributing heat to the refrigerant transitioning to a gaseous state in the coil. The now-cooled air reduces or maintains the air temperature within the cargo volume. The compressor is mounted to the vehicle engine and is driven by a belt that is in turn driven by the vehicle engine's crank shaft. The compressor receives refrigerant from the evaporator through a refrigerant line extending from the evaporator in the cargo enclosure up to the compressor in the engine bay. The compressor is configured to operate at a speed at engine idle that provides a necessary fluid pressure to the refrigerant flowing through the refrigerant line. A secondary compressor is optionally provided within the refrigerant loop, back at the cargo enclosure. An electric motor drives the secondary compressor, with the electric motor being driven by a shore power connection. While the vehicle is moving in operation and, therefore, there being no shore power connection, the refrigerant path bypasses the secondary compressor through a bypass refrigerant flow path around that secondary compressor that is controlled by a bypass valve upstream of the secondary compressor/bypass flow path. Similarly, a bypass refrigerant path bypasses the primary compressor, as controlled by an upstream bypass valve that bypasses the primary compressor whenever shore power is connected to the electrical system to drive the secondary compressor. The refrigerant system controller controls both bypass valves. Such a system is marketed under the model designation V320 MAX by Thermo King LLC of Minneapolis, MN.

It is also known to provide a refrigeration system on a large refrigerated commercial cargo vehicle that is driven by a small, self-contained secondary internal combustion engine mounted on the cargo enclosure. The core components of the refrigeration system include a compressor, a condenser coil, an expansion valve, and an evaporator coil, in that flow sequence, along a refrigerant flow path defined by a refrigerant conduit extending in a loop sequentially among those components. The disposition and operation of these components is as described above, except that the compressor is mounted on the cargo enclosure structure, rather than on the vehicle's drive engine in the vehicle engine bay, and that the compressor and evaporator/condenser fan are driven mechanically by a belt driven by the output of a self-contained internal combustion engine also mounted on the cargo enclosure structure, or electrically by an alternator mechanically driven by the self-contained engine, rather than by the vehicle's drive engine. Such a system, operating at approximately 15,000 BTU/hr. in applying conditioned air at 35° F. with a compressor driven by a 13 horsepower diesel engine mounted on the cargo enclosure, is marketed under the model designation T-590 by Thermo King Corporation of Minneapolis, Minnesota.

It is also known to provide a refrigeration system on a refrigerated commercial cargo vehicle rearward of the vehicle engine that is driven by electric power provided by the vehicle's alternator mounted on the vehicle drive engine. The alternator provides power (12 VDC in the United States; 24 VDC in Europe) to various components (e.g., lights, gauges, and radio equipment) that draw DC electric current for operation. The core components of the refrigeration system include a compressor, a condenser coil, an expansion valve, and an evaporator coil, in that flow sequence, along a refrigerant flow path defined by a refrigerant conduit extending in a loop sequentially among those components. The disposition and operation of these components is as described above, except that the compressor is mounted on the cargo enclosure structure, rather than on the vehicle's drive engine in the vehicle engine bay, and that the compressor is driven by the vehicle alternator. The vehicle alternator provides electric power to the compressor motor, the compressor fan motor, and the evaporator fan motor, via a cable that extends from the engine bay to the cargo enclosure, carrying electric current from the alternator to those components. The refrigeration system's capacity is limited by the electric current available from the alternator. Such a system, operating at approximately 3600 BTU/hr. in applying conditioned air with a compressor motor driven by a 12 VDC alternator mounted on the vehicle engine, is marketed under the model designation E-200 by Thermo King Corporation of Minneapolis, Minnesota.

SUMMARY

In an embodiment, a refrigerated cargo vehicle has a chassis and body assembly defining an engine compartment and a cargo enclosure. A plurality of wheels is attached to the chassis and body assembly at a forward end thereof. A plurality of wheels is attached to the chassis and body assembly at a rearward end thereof. An engine is mounted to the chassis and body assembly at the engine compartment. An alternator is operatively connected to the engine so that the alternator outputs first electric current when the alternator is driven by the engine. The vehicle has a first refrigerant path. A compressor is mounted on the chassis and body assembly, located in the refrigerant path, and configured to pump refrigerant located in the refrigerant path so that the refrigerant flows through the refrigerant path. A condenser is mounted in the chassis and body assembly and is located in the first refrigerant path. A first fan is disposed on the chassis and body assembly with respect to the condenser to move first air in a first air flow across the condenser so that the condenser transfers heat to the first air from refrigerant in the refrigerant path that moves through the condenser. An evaporator is mounted on the chassis and body assembly and located in the refrigerant path. A second fan is disposed on the chassis and body system with respect to the evaporator to move second air in a second air flow across the evaporator so that the evaporator transfers heat from the second air to the refrigerant in the refrigerant path that moves through the evaporator and so that the second air flows in the cargo enclosure from the evaporator. A first DC-to-DC power converter is disposed electrically between the alternator and the compressor so that the first DC-to-DC converter receives the first electric current from the alternator at a first electric potential and outputs second electric current to the compressor and wherein the DC-to-DC converter is configured to output the second electric current at a second electric potential higher than the first electric potential.

In another embodiment, a refrigerated cargo vehicle has a chassis and body assembly defining an engine compartment and a cargo enclosure. A plurality of wheels is attached to the chassis and body assembly at a forward end thereof. A plurality of wheels is attached to the chassis and body assembly at a rearward end thereof. An engine is mounted to the chassis and body assembly at the engine compartment. An alternator is operatively connected to the engine so that the alternator outputs first electric current at an electric potential in the range of about 12 VDC to about 14 VDC when the alternator is driven by the engine. The vehicle has a first refrigerant path. A rotary compressor with a permanent magnet motor having a voltage rating that is greater than 14 VDC and less than 50 VDC is mounted on the chassis and body assembly, is located in the refrigerant path, and is configured to pump refrigerant located in the refrigerant path so that the refrigerant flows through the refrigerant path. A condenser is mounted in the chassis and body assembly and is located in the first refrigerant path. A first fan is disposed on the chassis and body assembly with respect to the condenser to move first air in a first air flow across the condenser so that the condenser transfers heat to the first air from refrigerant in the refrigerant path that moves through the condenser. An evaporator is mounted on the chassis and body assembly and is located in the refrigerant path. A second fan is disposed on the chassis and body system with respect to the evaporator to move second air in a second air flow across the evaporator so that the evaporator transfers heat from the second air to the refrigerant in the refrigerant path that moves through the evaporator and so that the second air flows in the cargo enclosure from the evaporator. A first DC-to-DC power converter having a solid state switched mode power supply is disposed electrically between the alternator and the compressor so that the first DC-to-DC converter receives the first electric current from the alternator at a first electric potential and outputs second electric current to the compressor. The DC-to-DC converter is configured to output the second electric current at a second electric potential that is higher than the first electric potential and at least as high as the voltage rating of the compressor.

The accompanying drawings, which are incorporated in and constitute a part of this specification, illustrate one or more embodiments of the present invention.

BRIEF DESCRIPTION OF THE DRAWINGS

Aspects of the present invention can be better understood with reference to the following drawings. The components in the drawings are not necessarily to scale. An enabling disclosure of the present invention, including the best mode thereof, is set forth in the specification, which makes reference to the appended drawings, in which.

Figure 1:
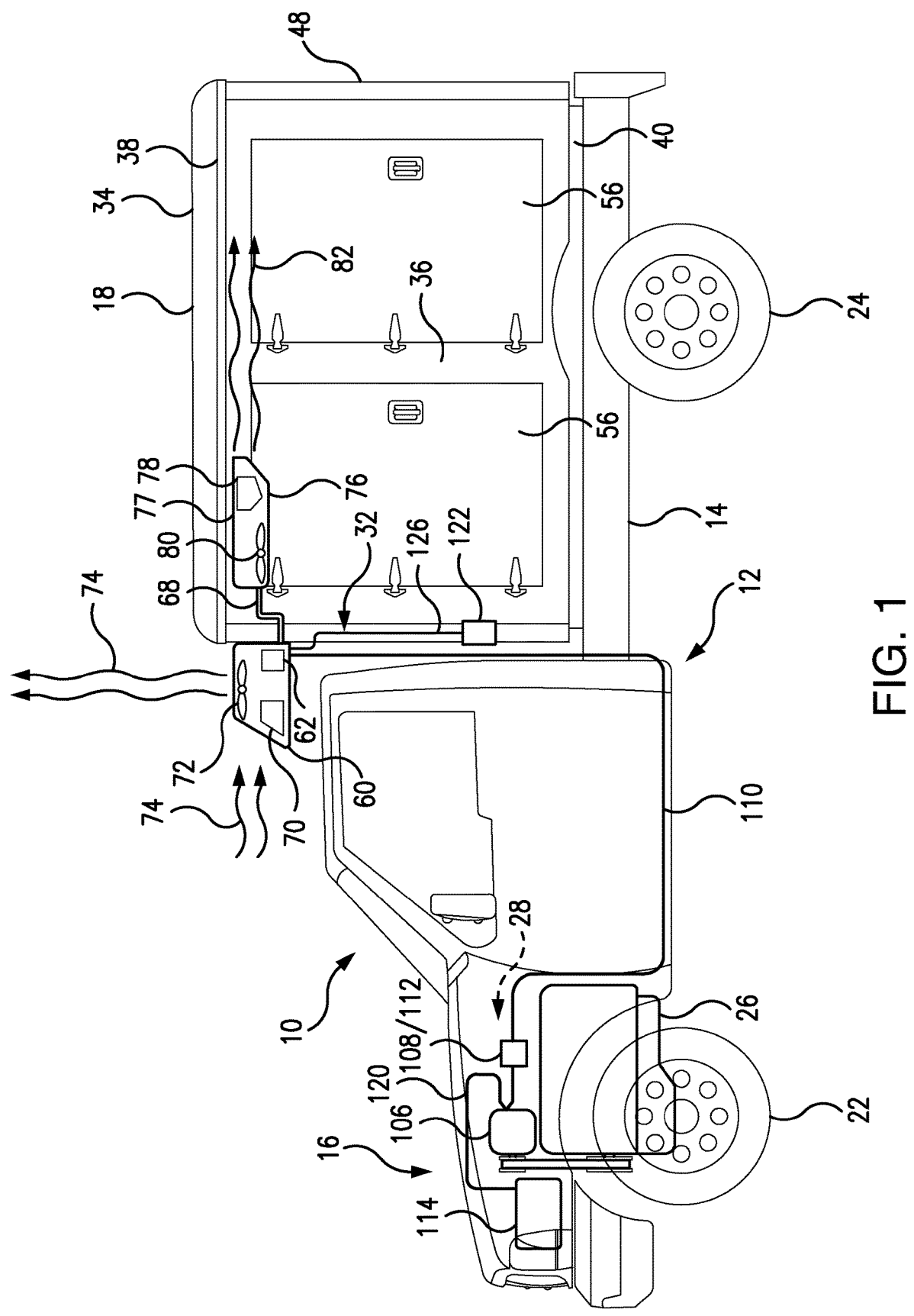
FIG. 1 is a schematic illustration of a refrigerated cargo vehicle having an integrated power system that integrates power from one or more sources to provide power for a refrigeration system, in accordance with an embodiment of the present invention.

Repeat use of reference characters in the present specification and drawings is intended to represent same or analogous features or elements of embodiments of the present invention.

DETAILED DESCRIPTION

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in such examples without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It should be understood that terms of orientation, e.g., "forward," "rearward," "upper," "lower," and similar terms as used herein are intended to refer to relative orientation of components of the devices described herein with respect to each other under an assumption of a consistent point of reference but do not require any specific orientation of the overall system. Thus, for example, the discussion herein may refer to the "forward," "rearward," "lateral," "side," or similar descriptions, referring to areas of or directions with respect to a cargo vehicle. Such terms may be used in the present disclosure and claims and will be understood to refer to a relative orientation but not to an orientation of a claimed device with respect to an external frame of reference.

As used herein, terms such as "air conditioning," "refrigeration," or "temperature control" apparatus, system, etc. encompass apparatus useable to change the temperature of air being delivered to a conditioned space and having an associated refrigerant circuit. Thus, an "air conditioning" or "refrigeration" or "temperature control" apparatus or system may comprise, without limitation, a refrigeration system having a non-reversible refrigerant circuit that may be used to cool air delivered to a conditioned space. The refrigeration system may have a condenser coil within the refrigerant circuit downstream from the compressor, an expansion device (such as an expansion valve) in the circuit downstream from the condenser, and an evaporator coil in the circuit between the expansion device and the compressor in the return refrigerant path. Respective fans move air over the condenser coil and the evaporator coil.

Moreover, the term "or" as used in this application and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on."

The phrase "in one embodiment," as used herein does not necessarily refer to the same embodiment, although it may. The phrase "at least one of A and B" is satisfied by any of A alone, B alone, A and B alone, and A and B with others. The phrase "one of A and B" is satisfied by A, whether or not also in the presence of B, and by B, whether or not also in the presence of A.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a refrigerated cargo vehicle 10 includes a chassis and body assembly 12 having a ladder-type frame 14, a cab body 16 mounted to frame 14, and an enclosed cargo compartment body 18 mounted to frame 14. It should be understood, however, that a body-on-frame construction as illustrated in FIG. 1 (in which the frame comprises the load bearing chassis that supports the body) is an example, but not the only example, of a chassis and body assembly that may be implemented in accordance with the present disclosure. The chassis and body assembly may also comprise, for example, a monocoque, or "unibody," arrangement in which individual elongated steel and/or aluminum frame members, in combination with larger, more planar, body and floor panels, together comprise the load bearing chassis, such that the chassis and body may be considered a unitary whole.

Vehicle 10 also includes a suspension system, a refrigeration system 20, a drive train system, and a steering system. The suspension system comprises a plurality (in this instance, two) of front wheels, wheel hubs, and corresponding tires 22, a plurality (in this instance, four) of rear wheels, wheel hubs, and corresponding tires 24, an axle assembly extending underneath and across the truck between individual or pairs of wheels that oppose each other on opposite sides of the truck, leaf springs that connect the axle assemblies to each of the two longitudinal frame members that comprise ladder-type frame 14, shock absorbers connecting the leaf springs to the wheel hubs, and associated torque rods, bolts, bushings, and stabilizers. It should be understood that various types of suspension systems may be employed, for example including airbags. The drive train comprises an engine 26 mounted in an engine bay 28 of cab body 16, a rear differential and drive axles that connect the rear differential to the wheel hubs, a longitudinal drive axle, and a transmission that translates the driving rotation from the engine crank shaft to the rear differential through the longitudinal drive axle.

Cargo compartment body 18 is comprised of a floor 30, a front wall 32, a rear wall (not shown), a roof 34, and two opposing side walls 36. Cargo compartment body 18 also comprises two opposing top rails 38 that extend longitudinally along the cargo compartment body and attach respective side walls 36 to roof 34, as well as two opposing bottom rails 40 that extend longitudinally along the cargo compartment body and attach respective side walls 36 to floor 30. A pair of opposing front posts 42 extend vertically between and connect respective side walls 36 to front wall 32. A front top rail 44 extends transversely to the vehicle's longitudinal axis between front posts 42 and connects front wall 32 to roof 34. A front bottom rail (not shown), generally parallel to front top rail 44, connects front wall 32 to floor 30. Front vertical posts 42 connect to side bottom rails 40, side top rails 38, front top rail 44, and the front bottom rail, forming part of the body frame that holds together the side walls, floor, front wall, and roof. Similarly, a pair of opposing vertical rear posts 48, rear top rail 50, and rear bottom rail (not shown) connect the side walls, roof, and floor at the vehicles rear and connect two side top rails 38 and side bottom rails 40 to complete the body frame. A rear wall panel (in one or more discrete sections) may attach to the rear frame, comprised of vertical rear posts 48, rear top rail 50, and the rear bottom rail. The rear wall panel may be continuous or may define one or more openings that receive and enclose therewith one or more rear doors (not shown) of a size and hingedly attached to the rear panel or the rear vertical posts so that, when closed, the rear panel and doors completely close the space bounded by the rear frame. Floor 30 may also have a variety of configurations and may, for example, comprise a generally planar wooden, polymer, or aluminum top floor sheet covering an insulation material and supported underneath by transverse cross members that attach at their respective ends to side bottom rails 40. Each of side walls 36 may be constructed of an inner fiber reinforced polymer (FRP) panel and an exterior FRP panel separated by a welded steel frame fitted with wooden or foam spacers (between the frame and the inner and exterior panels) to reduce thermal conductivity and enclose the inner volume between the panels. That inner volume is then injected with foam resins that expand, harden, and cure, adhering to the inner and exterior panels and framing to produce, together, a rigid structural wall panel. Each side wall, front wall, roof and rear wall are similarly constructed and assembled to form, with side and/or rear doors, a refrigerated box mounted on chassis frame 14 behind vehicle cab body 16. In view of the present disclosure, it should be understood that the vehicle structure may vary. For instance, the wall structures may be formed in a foam-insulated sheet-and-post construction, particularly in longer, semi-trailer/tractor vehicles. Thus, it should be understood that the vehicle structures specifically discussed herein are solely for purposes of example and are not presented for purposes of limitation of the present disclosure.

Volume 58 may be a single, undivided volume or may be, for example, divided into sub-volumes by interior walls or panels so that there is no air flow communication between the sub-volumes, of which there may be two or three. The sub-volumes may be used, for example, to maintain different temperature regions. A rearmost sub-volume, for example, may be unrefrigerated and be used for cargo not requiring cooling. The remaining forward part of volume 58 may be divided by a longitudinal interior wall into two side halves, one being refrigerated to a medium refrigeration (for example, about 45° F.) and the other being refrigerated to a low temperature (for example, about −5° F.). Alternatively, there may be two sub-volumes, one for frozen refrigeration and one for non-frozen refrigeration, without a dry goods sub-volume. The refrigeration system may be configured to maintain one refrigerated compartment at a predetermined temperature for frozen food. A separate cooling unit may be provided for a second, non-frozen refrigerated compartment, or some of the cold air in the frozen food refrigerated compartment may be diverted to the non-frozen refrigerated compartment.

Figure 2:
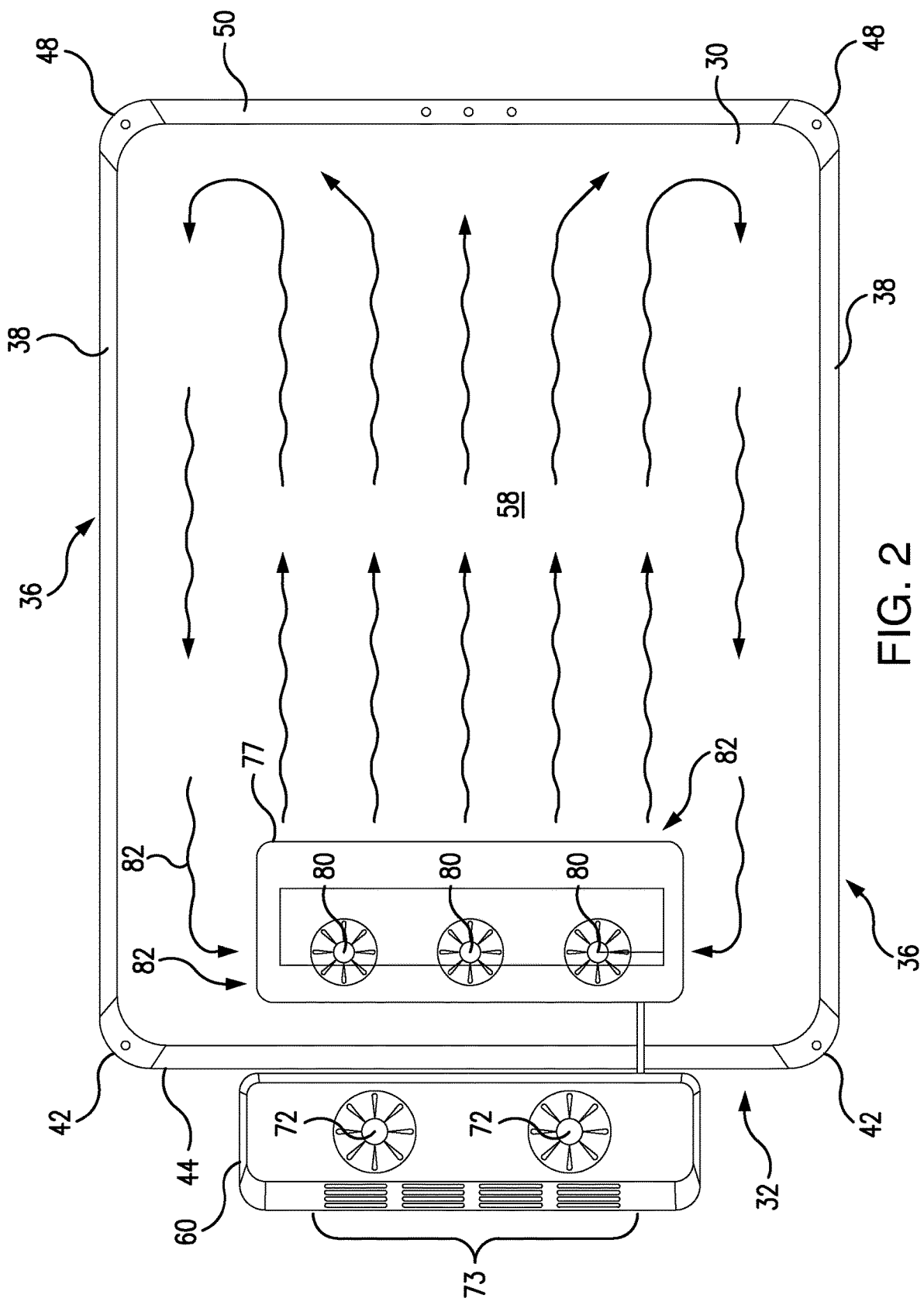
FIG. 2 is a partial top schematic illustration of the refrigerated cargo vehicle as illustrated in FIG. 1, omitting the cargo enclosure roof.
Figure 3:
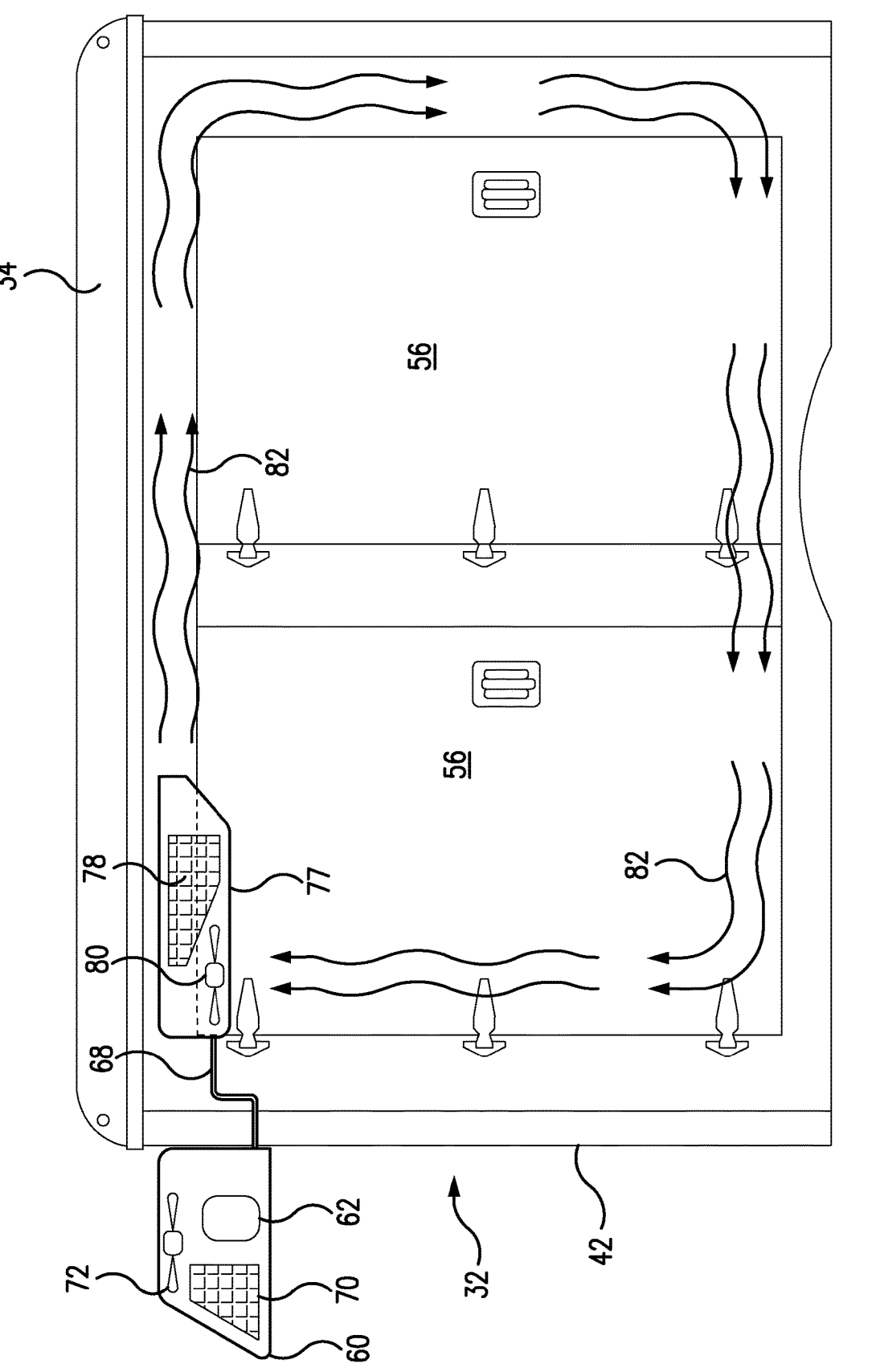
FIG. 3 is a partial side schematic illustration of the refrigerated cargo vehicle as illustrated in FIG. 1.
Figure 4:
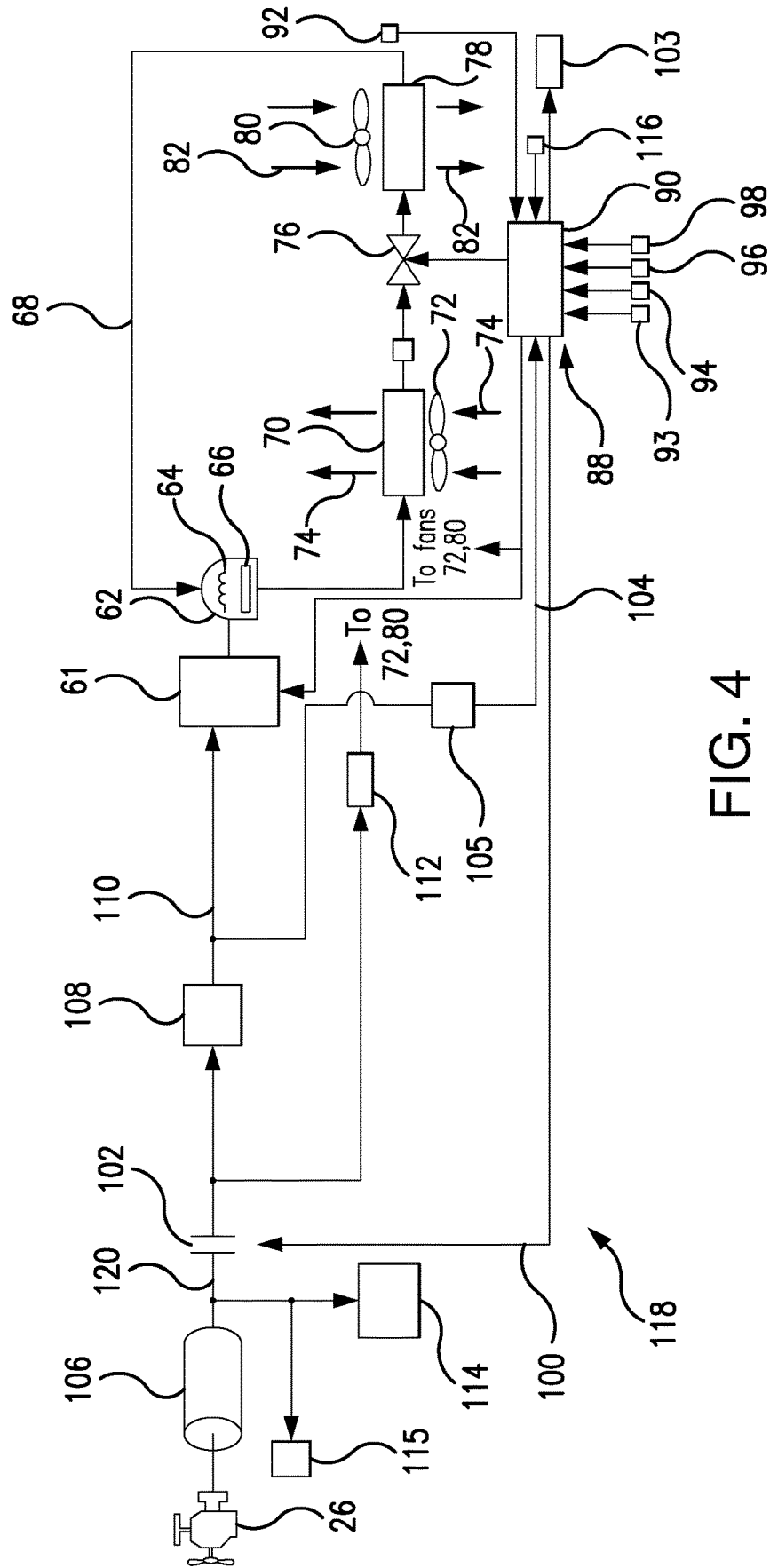
FIG. 4 is a schematic illustration of an embodiment of an integrated power system, refrigeration system, and certain vehicle components for use in a refrigerated cargo vehicle as illustrated in FIG. 1.

Still referring to FIGS. 1-3, and also to FIG. 4, refrigeration system 20 includes a condenser unit with an outer housing 60 attached to front side wall 32 that encloses certain components of system 20, e.g., in one or more embodiments, a rotary type compressor 62, having a rotary compression device 64, such as a screw, scroll, or vane or lobe arrangement, and a permanent magnet motor 66, is disposed within housing 60. As should be understood, a permanent magnet motor may be an AC motor. As discussed herein, in some embodiments, the power source primarily driving the permanent magnet motor is a DC output alternator driven by vehicle engine 26. Accordingly, an inverter 61 is disposed in housing 60 to convert the alternator's DC current to AC to, thereby, drive motor 66. In one or more embodiments, the compressor may be a device marketed under the name MASTERFLUX SIERRA03-098Y3 by Tecumseh Products Company LLC of Ann Arbor, Michigan. A closed loop, hermetically sealed refrigerant path 68 conducts a suitable refrigerant, such as R404a, through a refrigerant tubing among the compressor, a condenser, an expansion device, an evaporator, and back to the compressor, where each device is disposed in the flow defined by the refrigerant tubing. Compressor 62 is disposed in refrigerant path 68 so that, when actuated, the compressor drives the refrigerant through the closed loop defined by the refrigerant path. A condenser coil 70 is disposed in housing 60 downstream of compressor 62 within refrigerant path 68 so that the condenser coil receives compressed refrigerant from the compressor. The condenser coil is air cooled by one or more (in this instance, two) fans 72, also disposed in housing 60 that draws ambient air 74 in a flow that the fan draws from outside of refrigeration system housing 60 (and outside vehicle 10) and through respective vents in housing 60 (in which fans 72 are disposed) to the housing interior. Fans 72 then drive the air flow over condenser coil 70 and then back to ambient through a second set of vents 73 in refrigeration housing 60. Passing over the condenser coil, the air flow removes energy (heat) from the refrigerant flowing through the condenser, assuring that the refrigerant flow is in a liquid state. From the condenser coil, compressor 62 drives the refrigerant in path 68 (refrigerant tubing of which passes through a sealed hole in front wall 32) to an expansion valve 76 disposed in a second housing 77 secured to the ceiling of cargo space 58 defined by the lower surface of roof 34, through which the refrigerant passes into an evaporator coil 78 disposed in rear housing 77 and, then, back to rotary compressor drive 64 of compressor 62 to thereby start the cycle through refrigerant path 68 again. Expansion valve 76 is disposed in the refrigerant line at an inlet to evaporator coil 78. As referenced herein, an expansion device, in this instance an expansion valve, receives the fluid refrigerant input at a high pressure and, depending on the settings within the valve, outputs the fluid at a lower pressure. This allows pressurized refrigerant in evaporator coil 78 to drop in pressure in the coil and change phase from a liquid to a gas and, in doing so, absorb energy. One or more (in this instance, three) second fans 80, disposed in rear housing 77, draws air 82 into the interior of rear housing 77 through opposing vents (not shown) in the two sides of rear housing 77 that open to cargo volume 58 (so that fans 80 disposed in housing 77 draw air 82 from cargo body 18 interior volume 58 into the interior of evaporator unit housing 77), to evaporator coil 78, and from evaporator coil 78 to a second set of vents in housing 77 that opens into cargo volume 58 so that the fans force the air back out into cargo body interior 58. As will be understood, the evaporator coil removes heat from air flow 82 as it flows over the coil, contributing heat to the gaseous refrigerant in the coil. The now-cooled air flow 82 then circulates within cargo compartment interior volume 58, cooling its contents.

A schematically depicted electronic control system 88 controls the various functions of refrigeration system 20 and operates various components thereof. Control system 88 may comprise a programmable logic controller (PLC) (or other computer) 90 that operates as a general system controller for refrigeration system 20. The PLC communicates with and controls (through suitable electrical wired or wireless connections, relays, power sources, and other electromechanical connections, as should be understood in this art) the actuation and operation of the components described herein, including but not limited to compressor 62 (via inverter 61), air-cooling condenser fans 72, evaporator fans 80, and all electrically controlled valves and relays. As such, the control system communicates with (via wired or wireless electrical connections) and controls the operative components of refrigeration system 20, including refrigerant flow. The reference to connections between control system 88 and each of the components of refrigeration system 20 encompass such communications and control. Such communication may also encompass communication between controller 90 and a temperature sensor 92 disposed within refrigerated cargo volume 58, e.g., mounted on an interior surface of a side wall 36 or of front wall 32, that provides a signal to the controller corresponding to the temperature within volume 58 and may also encompass communication between the controller and a temperature sensor 93 ambient to system 20, e.g., mounted on the exterior of front wall 32, that provides a signal to the controller corresponding to temperature of the environment ambient to system 20. One or more embodiments discussed herein include a temperature sensor 92 without a temperature sensor 93. Furthermore, control system 88 receives input signals from an input 94 at a driver user interface (e.g., including touch screen options, dials, or switches) located in the cabin of cab body 16 through which the driver provides instructions to controller 90 identifying the set point temperature at which the driver desires to cool cargo interior area 58. Controller 90 compares the temperature signal from sensor 92 to the driver-initiated set point from input 94. If the temperature of interior volume 58 is above the set point, controller 90 sends a signal to actuate compressor 62 and fans 72 and 80 via intermediate relays, thus activating the refrigeration system to an air-cooling mode of operation. If the temperature identified by the signal from sensor 92 is at or below the set point, controller 90 sends control signals to deactivate the compressor, the condenser fans, and the evaporator fans, thereby deactivating the refrigeration system from an air-cooling mode. Controller 90 may, in one or more embodiments, control expansion valve 76 to open or close and may control the valve's internal volume to select a desired operational mode. The operation of refrigeration controllers in generating such instructions should be well understood and is, therefore, not discussed further herein. Accordingly, reference herein to the various functions performed by control system 88 may encompass communications between the control system and the compressor, condenser fans, and evaporator fans.

The control system activates and deactivates the refrigeration system components based on the system programming in response to signals from the thermostat, as noted, but may also respond to other sensors of system 20. For example, each door 56 may be associated with a respective sensor 96 that changes its output signal's state depending on whether the door is open or closed. In one or more embodiments, controller 90 is programmed to deactivate the refrigeration system at any time a signal received from a door sensor 96 indicates a door to cargo interior volume 58 is open. Further, the driver interface in the cabin of cab 16 may also include a system on/off control input 98 that allows the vehicle driver to activate and deactivate the refrigeration system. When the signal from on/off input 98 is an instruction to activate the system, controller 90 monitors the inputs 92, 94, and 96 and operates the system, as described above, and outputs a control signal at 100 to a master contactor 102 to close, thereby allowing the application of power to the refrigeration system, as discussed below. When the signal from on/off input 98 is an instruction to deactivate the system, controller 90 outputs signals to deactivate the compressor and the condenser and evaporator fans and outputs a control signal at 100 to master contactor 102 to open, thereby disconnecting the power that would otherwise be provided to the refrigeration system. Controller 90 also receives a signal 116 from battery 114 indicating the battery's output voltage. If signal 116 indicates the battery's voltage level has dropped below a predetermined value (such as 12.2V), controller 90 sends a signal to open contactor 102, thereby potentially reducing the power drain from the battery (a backup power line from battery 114 to controller 90 may be provided to provide power to the controller when contactor 102 opens). Controller 90 also opens master contactor 102 upon detection of any other system fault, e.g., compressor temperature limit, compressor stall, or loss of temperature sensor input, and actuates one or more alarms 103 upon system fault detection. In one or more embodiments, a variable-speed compressor 62 is used, and controller 90 controls compressor speed. Compressor speed may be reduced, e.g., in some conditions to reduce power consumption from the chassis (because compressor speed reduction reduces refrigeration system capacity) when a drop in battery level, as described above, indicates that the alternator is unable to provide sufficient power to the vehicle's electrical loads, including the refrigeration system. Compressor speed control may also be useful to reduce system noise.

As noted, power to controller 90 is provided at 104 from the 12 VDC bus. In one or more embodiments, e.g. as shown in FIG. 4, power to processor 4 is provided at 104 from a 48 VDC bus, via a 48V-to-12V converter 105. In one or more other embodiments, e.g. as illustrated in FIGS. 5-13, the 12V power to processor 90 is provided, when the vehicle is activated in operation, directly from a 12V line from the vehicle 12V alternator or 12V battery either downstream (FIG. 8) from contactor 102 or upstream (FIGS. 5-7 and 9-13) from contactor 102. When the vehicle is deactivated, and AC power is provided to the vehicle through a shore power connection, 12 VDC power is provided to processor 90 via an AC-to-12 VDC converter 107 (FIGS. 5-7 and 9-13). Thus, power is provided to the processor if the vehicle is activated or if the vehicle is deactivated but the electrical system is operatively connected to shore power. As noted, a backup power connection from battery 114 to processor 90 may be provided to power the processor when neither alternator power nor shore power is available. While in FIGS. 4 and 8, power line 104 is connected to the 12 VDC line downstream from contactor 102, it should be understood that power line 104 may be driven directly from the 12V line upstream from contactor 102 at all times, so that power is provided to the processor either from the vehicle alternator, when the vehicle is activated, or from the vehicle 12V battery, when the vehicle is deactivated, regardless of the state of contactor 102.

Actuation of the refrigeration system may refer to activation of the compressor to move refrigerant through the refrigerant path, activation of the condenser fan, and activation of the evaporator fan, in certain embodiments.

It will be understood from the present disclosure that the functions ascribed to control system 88 may be embodied by computer-executable instructions of a program that executes on one or more PLCs or other computers that operate(s) as the general system controller for system 20. Generally, program modules include routines, programs, components, data structures, etc., that perform particular tasks and/or implement particular abstract data types. Moreover, those skilled in the art will appreciate that the systems/methods described herein may be practiced with various controller configurations, including programmable logic controllers, simple logic circuits, single-processor or multi-processor systems, as well as personal computers, hand-held computing devices, microprocessor-based or programmable consumer or industrial electronics, and the like. Aspects of these functions may also be practiced in distributed computing environments, for example in so-called "smart" arrangements and systems, where tasks are performed by remote processing devices that are linked through a local or wide area communications network to the components otherwise illustrated in the Figures. In a distributed computing environment, programming modules may be located in both local and remote memory storage devices. Thus, control system 88 may comprise a computing device that communicates with the system components described herein via hard wire or wireless local or remote networks.

A controller that could effect the functions described herein could include a processing unit, a system memory and a system bus. The system bus couples the system components including, but not limited to, system memory to the processing unit. The processing unit can be any of various available programmable devices, including microprocessors, and it is to be appreciated that dual microprocessors, multi-core and other multi-processor architectures can be employed as the processing unit.

Software applications may act as an intermediary between users and/or other computers and the basic computer resources of electronic control system 88, as described, in suitable operating environments. Such software applications include one or both of system and application software. System software can include an operating system that acts to control and allocate resources of control system 88. Application software takes advantage of the management of resources by system software through the program models and data stored on system memory.

An integrated power system 118 integrates power from multiple sources for refrigeration system 20. In the one or more embodiments as illustrated in FIG. 4, integrated power system 118 integrates power from an alternator 106 mounted on engine 26 and driven by the engine's crankshaft through a belt and pully arrangement, as should be understood. Alternator 106 generates AC electric power internally and rectifies the output into DC for storage in the vehicle's starting battery 114 and application to vehicle components (indicated at 115) such as lights, gauges, and radios and other equipment. North American vehicles generally have 12-volt electrical systems. Alternators for 12-volt systems will generally have a charging voltage of approximately 13.5 VDC to 14.5 VDC with approximately 50A at engine idle and approximately 120A at a certain rated engine speed, such as 6000 rpm. One or more embodiments as discussed herein, however, use higher-capacity 12 VDC alternators (having a charging voltage of approximately 13.5 VDC to 14.5 VDC) that output electric current at approximately 160A at engine idle (e.g., at an engine crankshaft speed of around 500-600 rpm and a corresponding alternator speed of approximately 1500 rpm in a class 4 truck). While such 12 VDC alternators are described herein, it should be understood that this is for purposes of example only and that other alternator arrangements could be used. As should be understood, alternator output, and alternator output as a function of engine speed, vary depending on the alternator construction, the pulley ratio between the engine crankshaft and the alternator shaft, and the engine compartment temperature. In one or more embodiments of the electrical system designs discussed herein, the alternator and its operational environment are chosen so that the lowest alternator current output, which should occur at engine idle, is at least sufficient to supply the electric current demand of the system loads the alternator serves. Thus, while in one or more vehicle embodiments, the alternator may be a 120A (50A at engine idle), alternator as typically provided in stock vehicle configurations, in one or more other embodiments, a higher capacity, 250A (160A at engine idle, alternator, or an alternator with a still higher rated amperage, may be used. Thus, in the present discussion, reference to a 12 VDC alternator will be understood to be made for purposes of convenience in explanation and that, in one or more embodiments, reference to "12 VDC" may encompass alternators designed for nominal 12 VDC systems but that generally operate between 13.5 VDC and 14.5 VDC output.

Disposed electrically between alternator 106 and compressor motor 66 is a DC-to-DC power converter 108, in one or more embodiments a solid state boost converter that may comprise a solid state switched mode power supply. As should be understood, a boost converter is a switched mode power supply that increases electric potential, and correspondingly reduces electric current, from the converter's input to its output. In one or more embodiments, alternator 106 operates at an approximately 13.5 VDC to 14.5 VDC output, and permanent magnet motor 66 is a three-phase variable speed motor, driven by a 48 VDC input to the motor's inverter drive. Thus, boost converter 108 converts the approximately 14 VDC output of alternator 106 to an approximately 48 VDC boost converter output that is applied to motor 66 through 48 VDC power bus 110. A suitable boost converter for this purpose is sold under the model designation DAYGREEN AIT2K4840. Similarly, a second DC-to-DC converter 112 is disposed electrically between alternator 106 and the electrical inputs to fans 72 and 80. In one or more embodiments, converter 112 is a solid state boost converter that converts the approximately 14 VDC output from the alternator to the approximately 24 VDC input potential needed to drive the fans. In one or more embodiments, boost converters 108 and 112 are mounted in the engine bay 28 of vehicle 10 (FIG. 1) to thereby minimize electrical losses or the use of large electrical cables between the alternator 106 and the boost converters. Due to the higher voltage, but correspondingly lower electric current, from the output side of the boost converters, losses on the 12 VDC bus line 110 between the boost converters and the compressor motor are less. In one or more other embodiments, however, boost converters 108 and 112 are disposed within condenser unit housing 60 (FIG. 1). A third DC-to-DC converter 105 may be disposed electrically between the 48 VDC output of converter 108 and the electrical input to controller 90. In one or more embodiments, converter 105 is a solid state boost converter that converts the approximately 48 VDC output from converter 108 to the 12 VDC input potential needed to drive the controller. In other embodiments, as illustrated herein, the 12 VDC power input to controller 90 may be provided by 12 VDC bus 120, and it should be understood that the acquisition of the 12V power supply to the processor may be made in such various manners interchangeably in the embodiments discussed herein. As should be understood, converter 105 may provide a more consistent power signal. Further, it should be understood that arrangements other than a solid state boost converter can be used. For instance, any or all of converters 108, 112, and 105 could be embodied as an inverter circuit having a vibrator portion that converts the low alternator voltage to a series of pulses, a transformer that converts the pulsed signal to a higher potential, and a rectifier that converts the transformer output to a DC signal at the higher potential. Further, the converter may comprise a motor-generator that converts the alternator potential to the potential needed by the compressor motor.

Without boost converters 108 and 112, the refrigeration system components would operate in response to a lower-voltage source, for example the output of the 12 VDC alternator. Lower voltage compressors usable with a source in the range of 12 VDC to 14 VDC generally have a relatively low capacity (e.g., in the range of about 3000 BTU/hr.), corresponding to about 880 watts of power. An 880 W refrigeration system would ideally draw approximately 63A from a 12 VDC/250A alternator assumed to have a charging capacity of approximately 14 VDC, which can supply about 160A at engine idle. If vehicle electrical components, other than the refrigeration system, draw about 20A, the alternator's remaining 140A should be enough to supply the refrigeration system. With a power capacity in such a range, however, the refrigeration system may not be able to provide sufficient cooling to a cargo volume to maintain the cargo volume at a desired setpoint over the expected range of ambient conditions and vehicle operating conditions.

In one or more embodiments, refrigeration system 20 is constructed with a higher capacity compressor, thereby providing the refrigeration system a power capacity sufficient to meet refrigeration needs over a broader range of ambient and vehicle conditions than can be met with the lower-capacity system. In one or more embodiments, the compressor is rated at 48 VDC. Assume, for example, that the refrigeration system is used in a vehicle having a refrigeration system with a power demand of approximately 6278 BTU/hr. In this example, alternator 106 is a high-capacity vehicle alternator, rated at about 250A and producing about 160A at engine idle. At the alternator's lowest output, which occurs at engine idle, alternator 106 would ideally need to provide refrigeration system 20 about 1841 watts (if DC-to-DC converter 108 operates at an approximately 95% efficiency, the power requirement would be approximately 1938 watts). Under an assumption that the alternator's output is about 14 VDC, this corresponds to the provision of about 132A (or about 138A assuming an about 95% converter efficiency). If the vehicle needs about 20A to power vehicle electrical components other than the refrigeration system, the alternator may effectively provide the entire power needed by the refrigeration system, without the need to draw additional power from battery 114. Since engine idle should correspond to the lowest alternator output, the alternator should be able to meet the refrigeration system's requirements. The alternator output at idle, however, could vary lower, e.g., due to manufacturing variances or temperature, causing the alternator not to provide sufficient current in some circumstances. Further, where the boost converters are disposed with the refrigeration system, rather than in the vehicle cab engine bay, and depending on the electric cable construction extending between the alternator and the boost converters, electrical losses in the cable could correspondingly increase the current demand on the alternator, in that the refrigeration system is a fixed wattage inductance load. Still further, the actual current drawn by the refrigeration system can be higher due to inefficiency of refrigeration system components. Thus, controller 90 may be programmed to control compressor 62 and its motor 66 to operate at a lower capacity if the controller detects a low output voltage at the battery, at 116, in that the low battery condition could reflect that the alternator is at least temporarily unable to meet the demanded current load.

The insertion of DC-to-DC converters 108 and 112 facilitates the use of the high capacity compressor and may increase the operational efficiency of refrigeration system 20. DC-to-DC converter 108, for example, converts the electric potential it sees at its input, i.e., at the alternator side, to approximately 48 VDC (+/−1.5%). As noted, lower voltage compressors usable with a direct source of current in the range of 12 VDC to 14 VDC would generally have a relatively low capacity (e.g., in the range of about 3000 BTU/hr.). The availability of a greater electric potential range (in the present example, up to about 48 VDC, which, being below 50 VDC, is within a common understanding of being a low voltage application, but in other examples being above 50 VDC or above 60 VDC) allows use of components that have a higher capacity than do components useful in lower capacity systems. Because the DC-to-DC converters convert an input electric potential to a higher electric potential, the converter's output electric current is lower than its input electric current, so that the input power and output power across the converter remain balanced (though accommodating losses due to efficiency below 100%, e.g., about 95%). In one or more embodiments, the DC-to-DC converters are mounted in the engine bay, in close proximity to the alternator, thereby avoiding increased current demand responsive to losses over the cable between the alternator and the boost converters. Thus, the increased-capacity refrigeration system may have a lesser increase in electric current draw from the alternator. Moreover, the efficiencies of the one or more DC-to-DC converters is directly related to the efficiency of the transmission of electric current from the alternator to refrigeration system 20. In one or more embodiments, each of the converters has an electrical efficiency above 85% (and in one or more embodiments at or above 95%) and may be, for example, a very high frequency (above 500 kHz) switch mode converter.

In one or more embodiments of a methodology by which to design the refrigeration system and its electrical communication with the vehicle electrical system, a determination is first made of the capacity at which refrigeration system 20 should desirably operate to meet the refrigeration requirements of the vehicle cargo volume at the desired set point temperature (e.g., the skilled person would understand that a lower set point will be needed to support transport of frozen food, e.g., −4° F. or −10° F., than would be needed to support refrigerated, but nonfrozen, food, e.g., 35° F. or 40° F.) and within the ambient temperature conditions expected to be encountered. The rated voltage and current of the vehicle's alternator, and the alternator's output at engine idle, will need to be considered in one or more embodiments, in which these variables are design boundaries unless the design scope includes the ability to select an alternator. If it is desired to operate at or below a maximum voltage level, for example one that is below an accepted threshold for high voltage systems (e.g., 50 VDC or 60 VDC), that electric potential limitation is identified. The compressor, compressor motor, and condenser and evaporator fans are chosen that enable the system to meet the capacity requirement determined above and that can operate at or below the maximum electric potential, if that is a limitation. If there is a maximum electric potential, it may be desirable in one or more embodiments to select system components that are as close to, but not above, the limiting electric potential as possible to thereby minimize the electric current output from the DC-to-DC converter(s). The DC-to-DC converter(s) can be selected or designed that provide an output power to the refrigeration system at the electric potential(s) needed to drive the various selected refrigeration system components. To the extent those components requiring electric power input do not all operate at the same potential or, if at a potential different from that of another component, one that is different from the direct alternator potential, more than one converter may be needed. For example, referring again to FIG. 4, compressor 62 operates at 48 VDC, while fans 72 and 80 operate at 24 VDC, resulting in two converters from the 14 VDC alternator. If, however, 12 VDC fans are used, e.g., as shown at FIGS. 8-12, the fans may be driven directly by alternator 106, obviating the need for converter 112. A starting point for component selection may be to make an initial selection of components having the highest efficiency of those available components that are at or close to the voltage limitation. Once an initial design is achieved, it may be modeled, using known modeling techniques, to determine whether the refrigeration system's electric current draw from the alternator at engine idle is at or below the maximum current level the alternator can actually provide at engine idle. If the initial design draws more than the available current at engine idle, the system may be redesigned until that objective is achieved, if it can be achieved. In one or more embodiments, refrigeration system 20 may be designed to draw more current than the alternator can provide at engine idle. In such systems, sufficient battery capacity is provided to support electric current needs at engine idle over the vehicle's expected operation, e.g., considering available recharging through shore power.

Once a design is optimized in this manner, whether or not the electric current objective is achieved, alternate designs may also be considered, possibly using components having a lower efficiency than in the initial, optimized design but that are preferable for other reasons. Thus, for example, while compressor 62, in the embodiments described above, may be a reciprocating compressor with an energy efficiency rating (EER) of about 3.0 to about 3.5, it will be understood that a reciprocating compressor (with high efficiency but high weight), a scroll compressor (with high efficiency but large in size), a swash plate compressor (with efficiency lower than that of the rotary compressor), or other compressor type may be used. Similarly, while compressor motor 66, in the embodiments described above, may be a DC permanent magnet motor having an efficiency in the range of 85% to 93% (and, typically, 90%-92%), compressor motor 66 may be an AC motor of an 80%-86% efficiency, a brush type permanent magnet motor of a 75%-80% efficiency range, or other motor. While each of the compressor fan and evaporator fan may be driven by a respective electronically commutated motor (designed for operation with a DC power source), it will be understood that other fan motors may be used.

Figure 5:
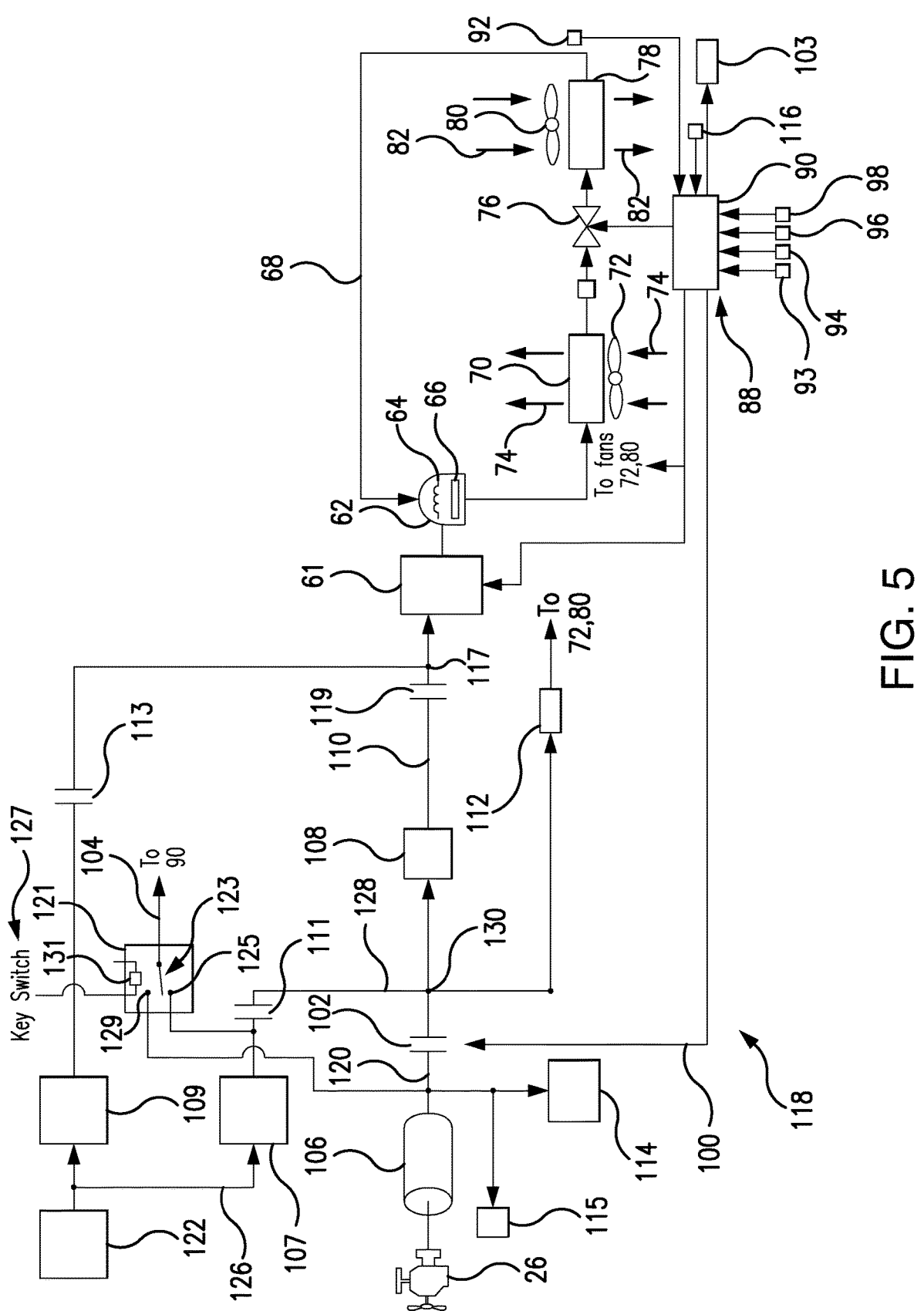
FIG. 5 is a schematic illustration of an embodiment of an integrated power system, refrigeration system, and certain vehicle components for use in a refrigerated cargo vehicle as illustrated in FIG. 1.

In one or more embodiments, the electrical system is capable of operation with a power source other than alternator 106, e.g., when engine 26 is deactivated. Referring to FIG. 5, for example, integrated power system 118 integrates power from multiple sources to provide power for refrigeration system 20. As discussed above, power system 118 includes an electrical cable 120 that conveys electric power to DC-to-DC converters 108 and 112 via master contactor 102. System 118 also includes a shore power connector 122 configured for operative connection to the AC utility grid (not shown) (which, with respect to a vehicle, is independent of the vehicle and sometimes referred to as "shore power"). Shore power connector 122, when connected to the utility grid, provides AC power (e.g., 208-240 VAC single phase or 230 VAC three phase power) to an AC-to-12 VDC power supply 107 through a power cable 126. AC-DC power supply 107 receives AC power from cable 126 and converts the AC power to a DC output, e.g., 12 VDC, that can typically be used as a charger for a 12V battery system or to supply power to 12 VDC components within an electrical system. In this instance, charger 107 provides its 12 VDC output to DC-to-DC converters 108 and 112 via electric cable 128, connecting to refrigeration power bus 120, via a contactor 111 controlled by controller 90, at junction 130 located electrically between master contactor 102 and converters 108 and 112.

In one or more embodiments, shore power connector 122 also provides AC power to an AC-to-48 VDC power supply 109 from cable 126. Charger 109 provides a 48 VDC output, via a contactor 113 controlled by controller 90, that connects to 48 VDC bus 110 at a point 117 between a controller 119 and the input to inverter 61. The source for controller power line 104 is selected by a switch assembly 121 having a switch element 123 normally biased to a first pole 125 that connects the processor power to 12 VDC shore power charger 107. Upon activation of a solenoid device 131 through activation of the driver's ignition switch 127, however, switch element 123 moves to second pole 129, thereby connecting processor power line 104 to the 12 VDC output of alternator 106 and battery 114.

In operation, when shore power connector 122 is not connected to the utility grid and the vehicle operator has activated the vehicle through switch 127, power to controller 90 is provided through switch element 123 from second switch pole 129 and its connection to alternator 106 and battery 114. Controller 90 controls contactors 113 and 111 (via suitable respective relays) to be open, thereby disconnecting the DC-to-DC converters from shore power connector 122. Controller 90 controls contactors 102 and 119 (via suitable respective relays) to be closed, thereby allowing alternator 106 and battery 114 to drive the refrigeration system. However, when connector 122 is connected to the grid, an electric current sensor (not shown) in the connector 122 outputs a signal to controller 90, thereby informing the controller that the utility grid is connected to power system 118. In that event, and assuming engine 26 remains active, the shore power connection takes precedence to alternator 106 as a power source for the refrigeration system. Accordingly, the programming of controller 90 is configured to respond to receipt of the signal from the shore power connector current sensor by outputting a signal over electrical connection 100 to master contactor 102, instructing the contactor to open. Controller 90 controls contactor 119 to be open, controls contactor 113 to be closed, and controls contactor 111 to be closed. This provides 48 VDC to the input to inverter 61 and a 12 VDC input to converter 112 for the refrigeration system fans, while alternator 106 continues to provide 12 VDC to controller 90 and the vehicle's house loads 115 and to charge battery 114. If the vehicle operator deactivates the vehicle's engine 26 (and, therefore, alternator 106) via ignition switch 127 while shore power is connected, switch element 123 moves to pole 125. Controller 90 controls contactors 113 and 111 to be closed and controls contactors 102 and 119 to be open, so that shore power 48 VDC charger 109 drives refrigeration system compressor 62 and shore power 12 VDC charger 107 provides power to the fans and controller 90. In one or more other embodiments, under this condition, contactor 102 is also closed, so that 12 VDC power is also provided from charger 107 to house loads 115 and battery 114. Thus, generally, when shore power is operably connected to connector 122, shore power is the power source for refrigeration system 20. This arrangement allows the vehicle driver to plug power system 118 into shore power, when available, when the vehicle is stopped, for example, for a period of time long enough that it is undesirable to maintain the vehicle constantly in operation and at engine idle, thereby allowing refrigeration system 20 to operate and keep refrigeration volume 58 (FIG. 1) at or below the desired setpoint temperature indefinitely, regardless of the vehicle's operational status. If the driver ignition switch 127 is deactivated, thereby deactivating engine 26 and alternator 106, and there is no connection to shore power at 122, contactors 102, 111, 113, and 119 are open, though in one or more embodiments contactors 102 and 111 may be closed to provide continued power to controller 90.

Figure 6:
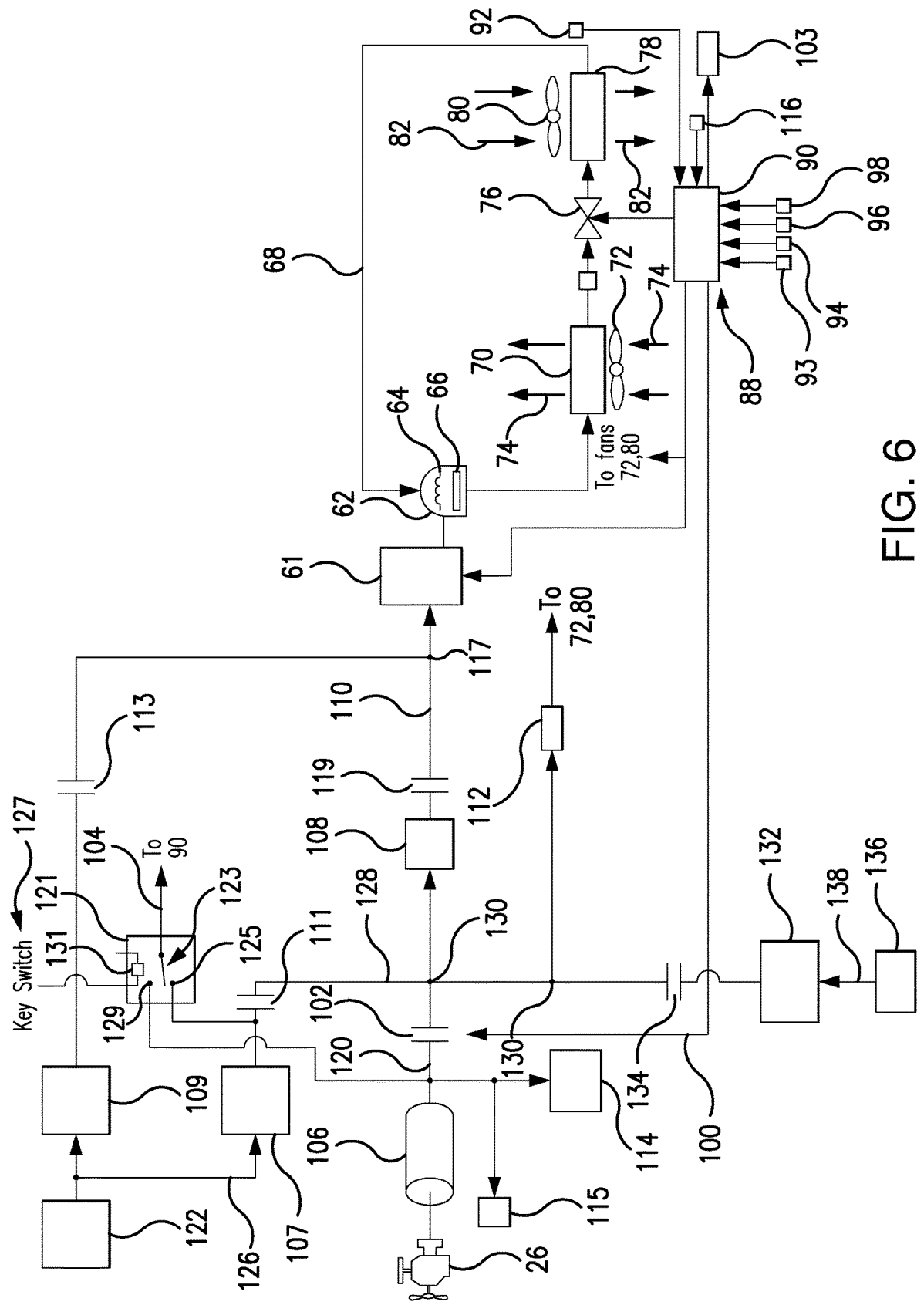
FIG. 6 is a schematic illustration of an embodiment of an integrated power system, refrigeration system, and certain vehicle components for use in a refrigerated cargo vehicle as illustrated in FIG. 1.

In a further embodiment, and with reference to FIG. 6, integrated power system 118 includes a 12 VDC battery 132 that may, like the 12 VDC vehicle battery, be mounted within engine bay 28 (FIG. 1) of vehicle cab body 16 (FIG. 1). The output of battery 132 is electrically connected to refrigeration power bus 120 at junction 130 via a contactor 134 that is controlled by system controller 90 via a relay (not shown), so that the battery's 12 VDC output is applied to the inputs of 12 VDC-to-48 VDC converter 108 and 12 VDC-to-24 VDC converter 112 when contactor 134 is closed but is electrically isolated from the converters when the contactor is open. Controller 90 controls the operation of contactor 134 through operation of the controller's programming. If shore power is connected at connector 122 or engine 26 is active, or both, controller 90 controls contactor 134 to be open and controls contactors 102, 111, 113 and 119 as described above with regard to the embodiment of FIG. 5. If there is no shore power connection at 122, and if engine 26 is inactive, controller 90 controls contactors 134 and 119 to be closed and controls contactors 102, 111 and 113 to be open. In one or more other embodiments, under such conditions, controller 90 controls contactors 102 and 113 to be open, controls contactors 134 and 119 to be closed, and also controls contactor 111 to be closed, to thereby provide power to controller 90 via switch assembly 121. Thus, when contactor 134 is closed, battery 132 provides 12 VDC power to the inputs of the DC-to-DC converters, allowing the converters to provide electrical power to refrigeration system 20, as discussed above. Battery 132 may have a shore power charger (not shown, or effected through connection with charger 107) in parallel with or in substitution for solar panels 136. As a result, battery 132 provides power to refrigeration system 20 when the vehicle engine is deactivated and no shore power source is applied and is recharged when shore power is applied. In such embodiments, battery 132 may be charged by shore power alone, such that there are no other electrical inputs to battery 132. In still further embodiments, however, one or more solar panels 136 mounted on the exterior of the roof of vehicle 10 (FIG. 1), of the cab or of the cargo box (or both), provide charging power to battery 132 via an electrical cable 138 and a charging regulator (not shown). As should be understood in this art, the one or more solar panels output direct current at a predetermined potential, e.g. 12 VDC. In such embodiments, generally, battery 132 provides 12 VDC power to the input of the DC-to-DC converters only when no power is provided from the vehicle alternator or a shore power connection.

Figure 7:
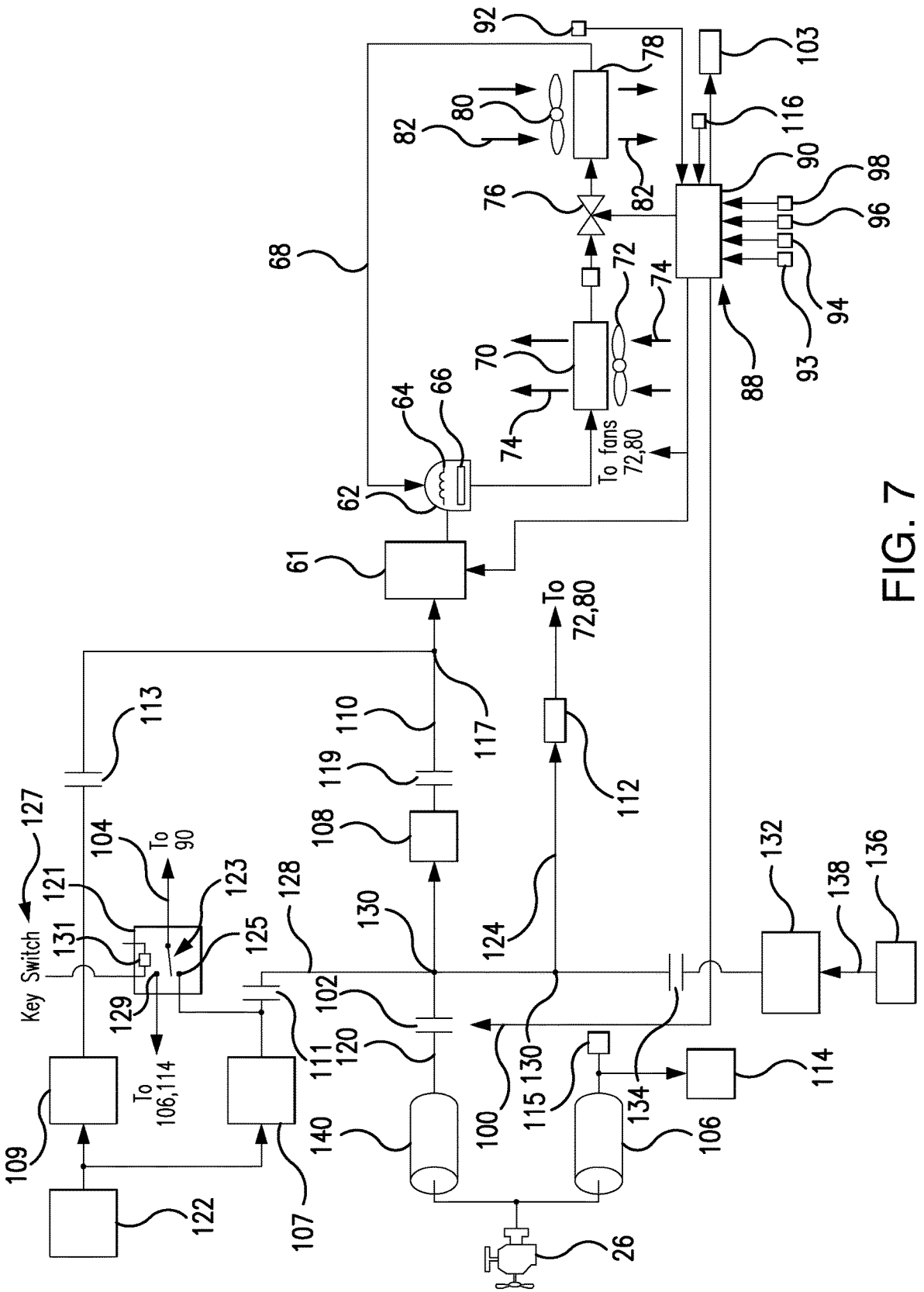
FIG. 7 is a schematic illustration of an embodiment of an integrated power system, refrigeration system, and certain vehicle components for use in a refrigerated cargo vehicle as illustrated in FIG. 1.
Figure 8:
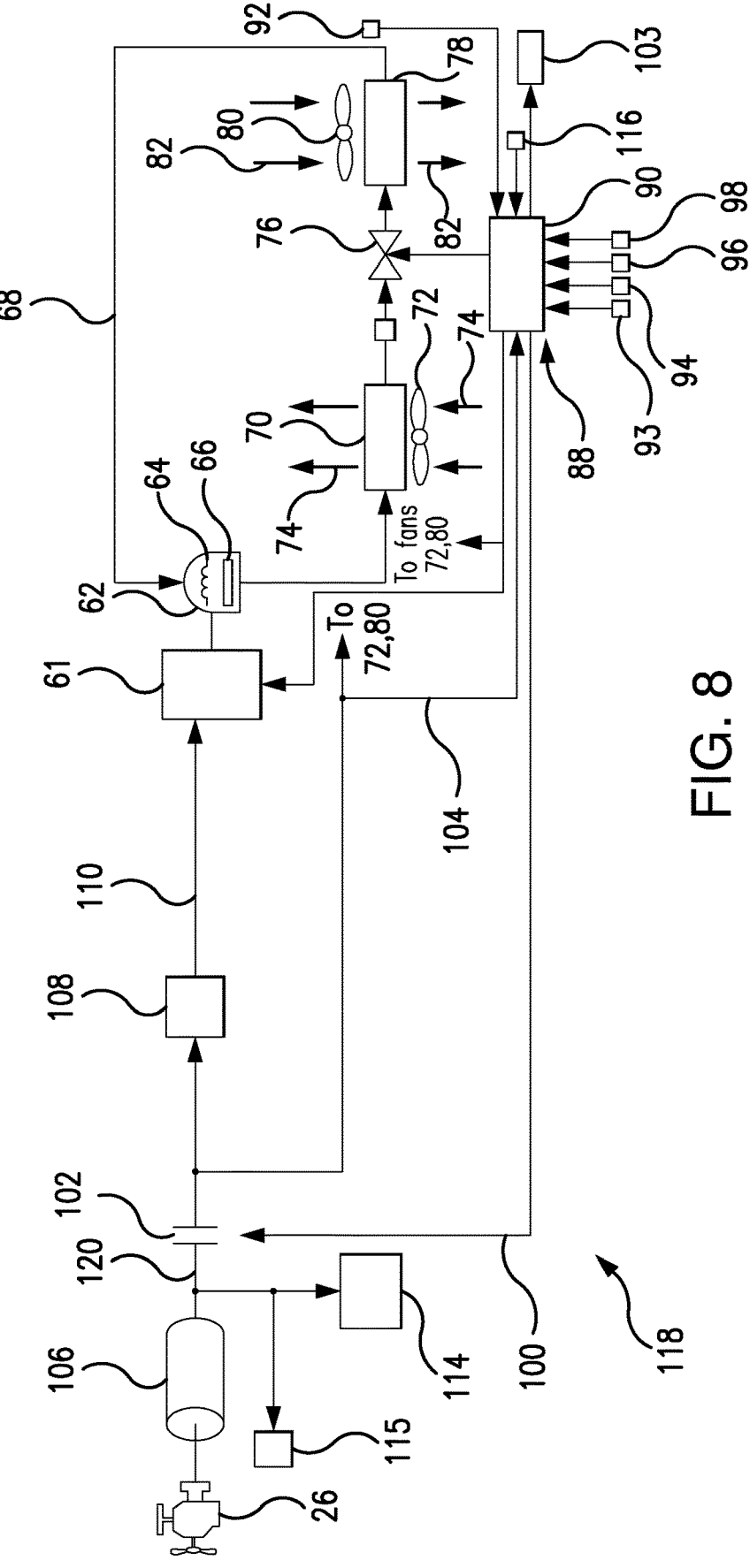
FIG. 8 is a schematic illustration of an embodiment of an integrated power system, refrigeration system, and certain vehicle components for use in a refrigerated cargo vehicle as illustrated in FIG. 1.
Figure 9:
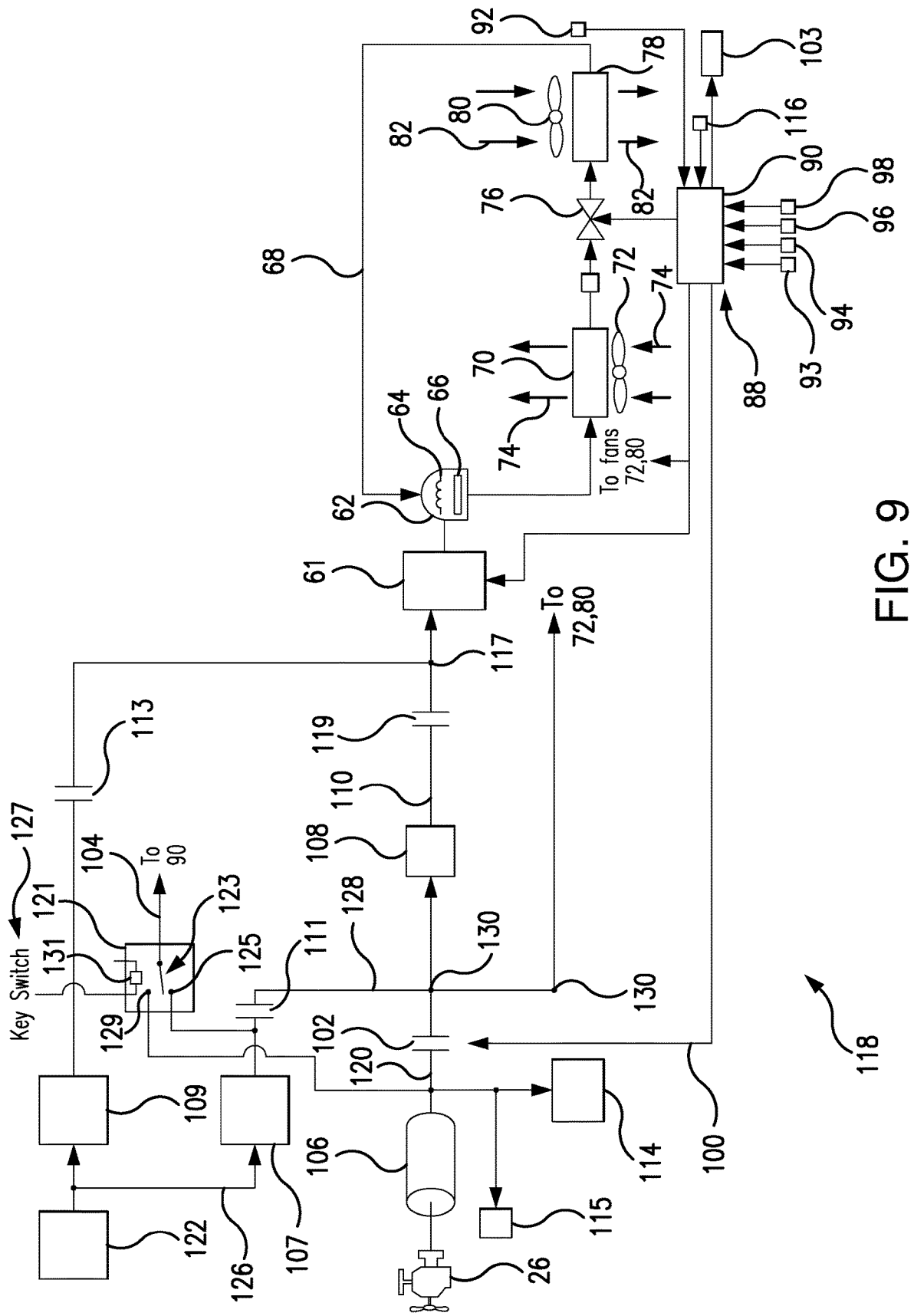
FIG. 9 is a schematic illustration of an embodiment of an integrated power system, refrigeration system, and certain vehicle components for use in a refrigerated cargo vehicle as illustrated in FIG. 1.
Figure 10:
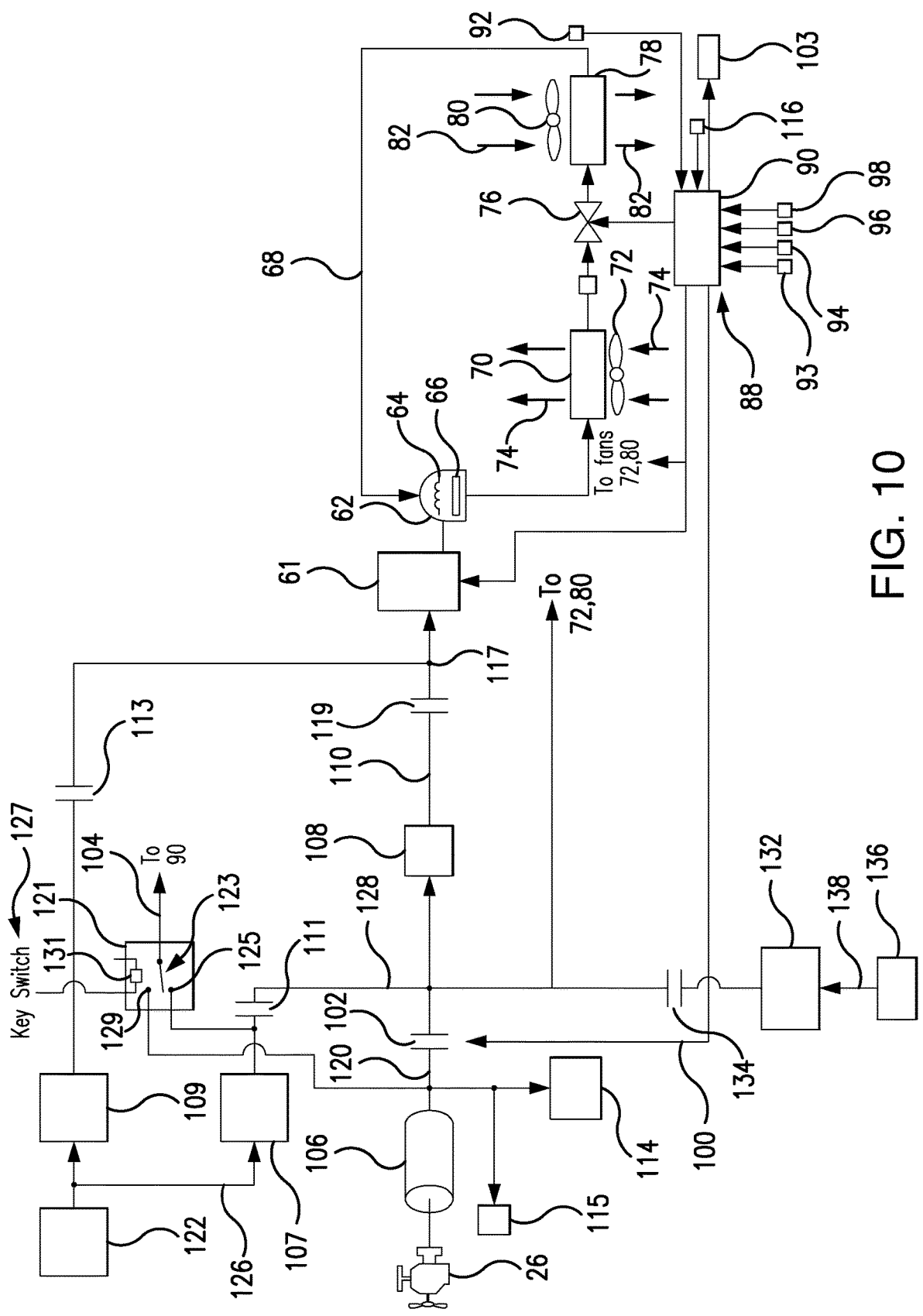
FIG. 10 is a schematic illustration of an embodiment of an integrated power system, refrigeration system, and certain vehicle components for use in a refrigerated cargo vehicle as illustrated in FIG. 1.
Figure 11:
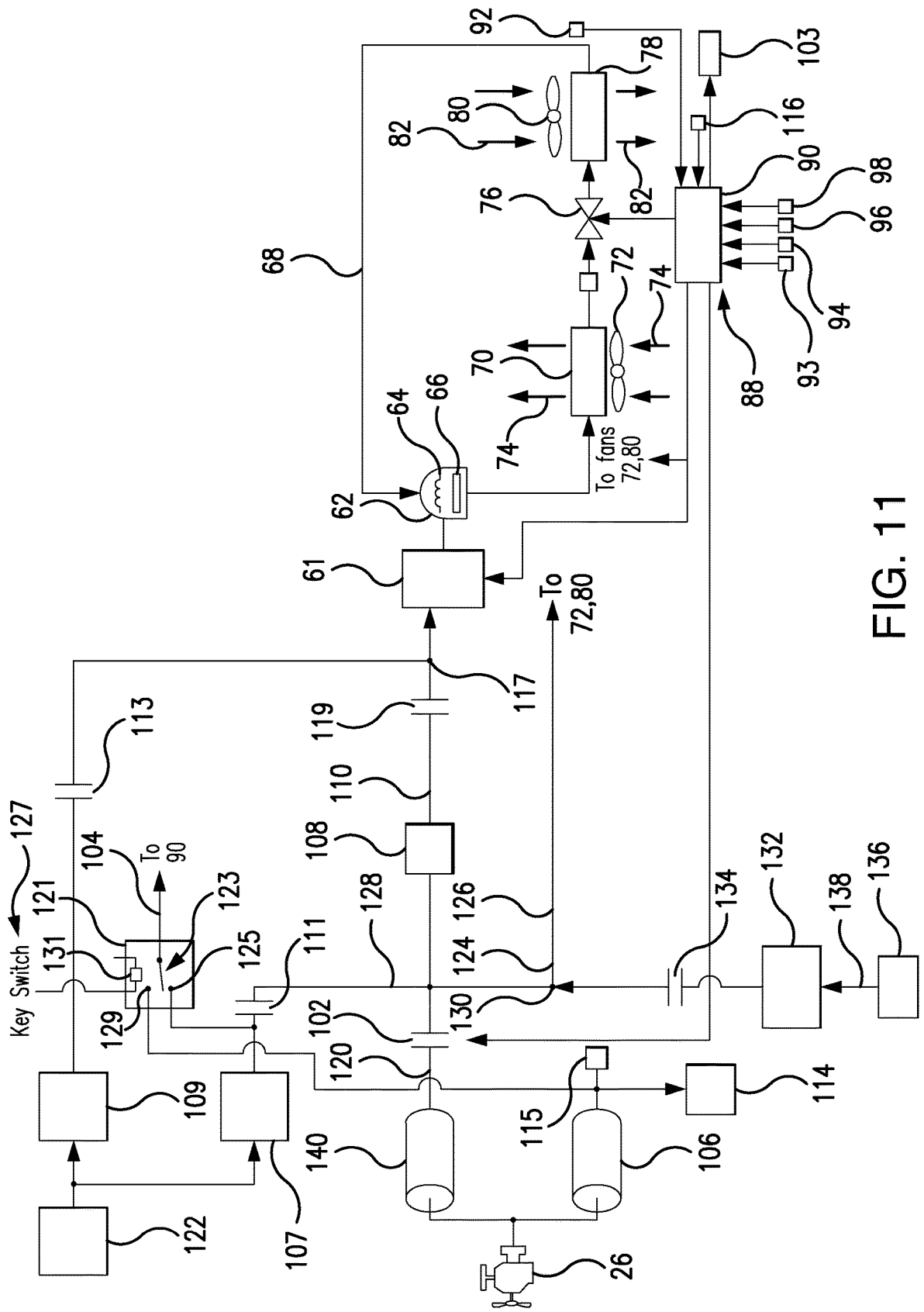
FIG. 11 is a schematic illustration of an embodiment of an integrated power system, refrigeration system, and certain vehicle components for use in a refrigerated cargo vehicle as illustrated in FIG. 1.

Referring to FIG. 7, alternator 106 is not electrically connected to the one or more DC-to-DC converters 108, 112, and 105 but, instead, electrically drives only the vehicle's other 12 VDC components. A second alternator 140 is mounted on engine 26 (FIG. 1) and driven by the engine's crankshaft through a belt and pully arrangement, as should be understood. Like alternator 106, alternator 140 generates AC electric power internally and rectifies the output into DC. But whereas, in these one or more embodiments, alternator 106 may be a standard 120A alternator that provides approximately 50A at engine idle and approximately 120A at a certain rated engine speed, such as 6000 rpm, alternator 140 is a higher-capacity 12 VDC alternator rated at approximately 250A, with electric current output at approximately 160A at engine idle. Alternator 140 applies its DC output to electrical system 118, and specifically to one or more DC-to-DC converters 108, 112, and 105, via master contactor 102 to power refrigeration system 20. The alternator's operation with regard to system 18 and refrigeration system 20 is as described above, except that because alternator 140 is not burdened with providing power to the non-refrigeration 12 VDC vehicle components, more electric current (and, in one or more embodiments, all electric current output from alternator 140) is available to provide more power to refrigeration system 20 via the converters. It will be understood in view of the present disclosure that in such embodiments, any one or more of a shore power connection, a secondary 12 VDC battery, and a solar panel power source may be used, in the same manner as discussed above.

FIGS. 8-11 illustrate modifications to the embodiments illustrated in FIGS. 4-7, respectively, in which fans 72, 80 are 12 VDC fans that are driven directly by alternator 106, without an intervening converter 112 (FIGS. 4-7). Power to processor 90 in these illustrated embodiments is provided directly from the alternator 106 output, although it should be understood that power could instead be provided by a 48 VDC-to-12 VDC converter, the input to which is connected to 48 VDC bus 110 between converter 108 and inverter 61, as is shown at 105 in FIG. 4.

Figure 12:
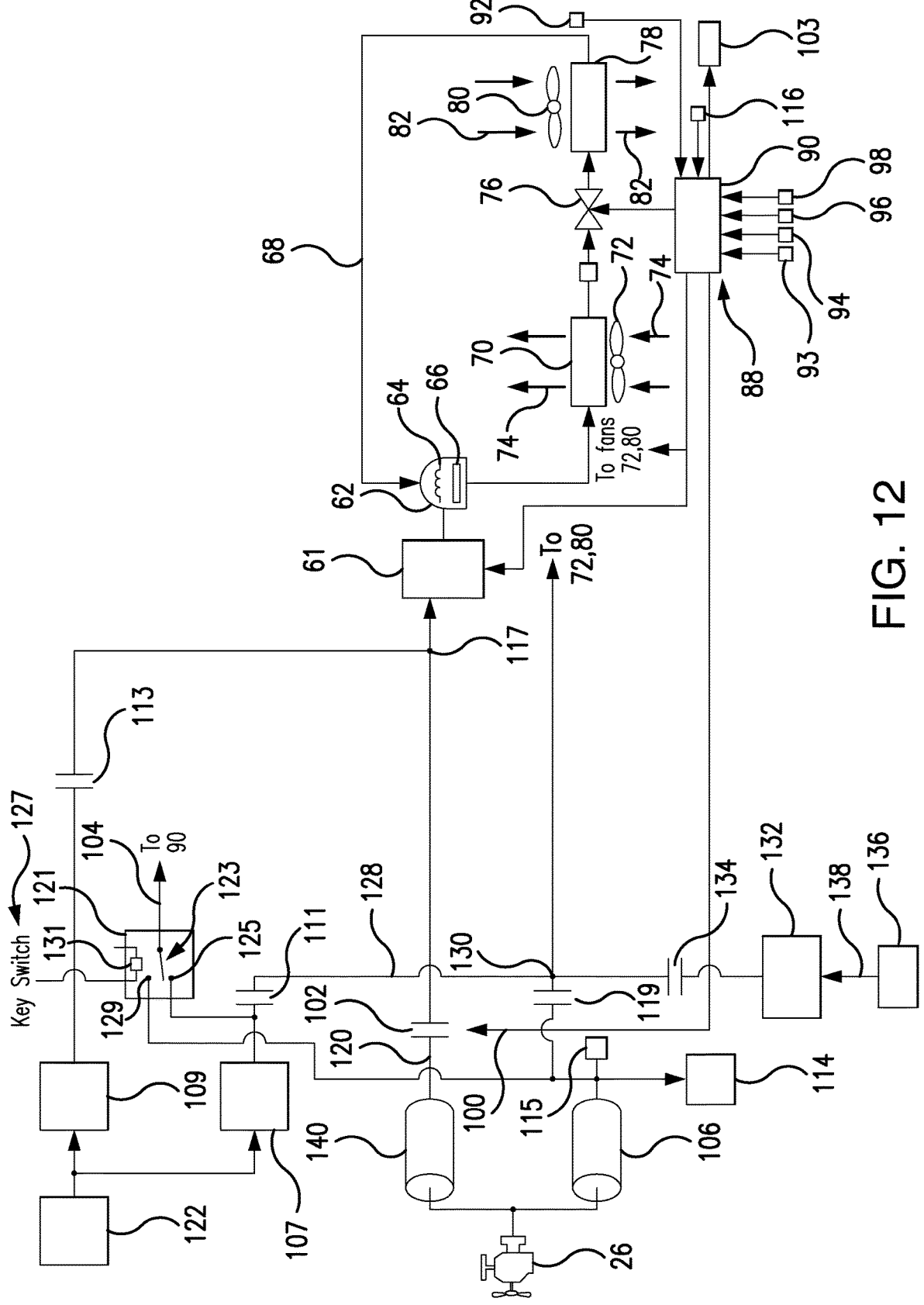
FIG. 12 is a schematic illustration of an embodiment of an integrated power system, refrigeration system, and certain vehicle components for use in a refrigerated cargo vehicle as illustrated in FIG. 1.
Figure 13:
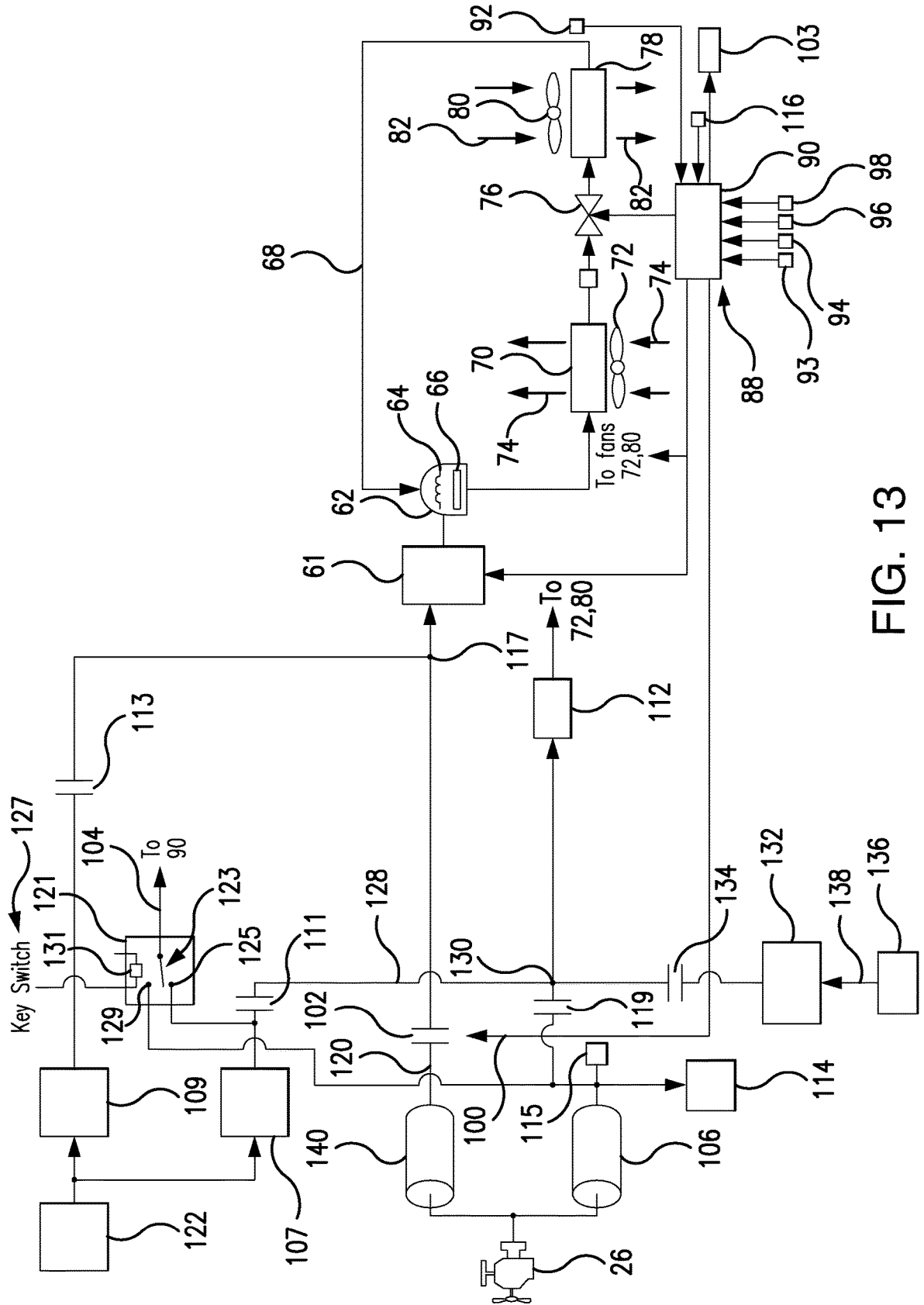
FIG. 13 is a schematic illustration of an embodiment of an integrated power system, refrigeration system, and certain vehicle components for use in a refrigerated cargo vehicle as illustrated in FIG. 1.

In a still further embodiment, illustrated in FIG. 12, alternator 140 is a higher-capacity, at approximately 48 VDC, alternator with electric current output at approximately 15A-45A at engine idle (e.g., at approximately 600-800 (engine) rpm in a class 4 truck). Given the alternator's 48 VDC output, no boost converter 108 (FIG. 7) is needed and is, therefore, omitted. If fans 72 and 80 can be driven directly by 12 VDC power, boost converter 112 (FIG. 7) may also be omitted, though in other embodiments, in which the fans are driven by a 24 VDC power source, boost converter 112 (a 12 VDC-to-24 VDC converter) is included between alternator 106 and the fans, as shown in FIG. 13. In any of the embodiments discussed herein, if the fans are configured to be driven by a 48 VDC source, boost converter 112 may be omitted and the fans driven directly by the 48 VDC line.

In operation, when shore power connector 122 is not connected to the utility grid and the vehicle operator has activated the vehicle through switch 127, power to controller 90 is provided through switch element 123 from second switch pole 129 and its connection to alternator 106 and battery 114. Controller 90 controls contactors 113 and 111 to be open, thereby disconnecting compressor inverter 61 and the refrigeration system fans from shore power connector 122. Controller 90 controls contactors 102 and 119 to be closed, thereby allowing alternator 140 to drive the compressor and alternator 106 and battery 114 to drive the refrigeration system fans. However, when connector 122 is connected to the grid, an electric current sensor (not shown) in connector 122 outputs a signal to controller 90, thereby informing the controller that the utility grid is connected to power system 118. In that event, and assuming engine 26 remains active, the shore power connection takes precedence to alternators 140 and 106 as a power source for the refrigeration system. Accordingly, the programming of controller 90 is configured to respond to receipt of the signal from the shore power connector current sensor by outputting a signal over electrical connection 100 to master contactor 102, instructing the contactor to open. Controller 90 controls contactor 119 to be open and controls contactors 111 and 113 to be closed. This provides 48 VDC to the input to inverter 61 and a 12 VDC input to the refrigeration system fans, while alternator 106 continues to provide 12 VDC to controller 90, the vehicle's house loads 115, and to charge battery 114. If the vehicle operator deactivates the vehicle's engine 26 (and, therefore, alternators 106 and 140) via ignition switch 127 while shore power is connected, switch element 123 moves to pole 125. Controller 90 controls contactors 113 and 111 to be closed and controls contactors 102 and 119 to be open, so that shore power 48 VDC charger 109 drives compressor 62 and shore power 12 VDC charger 107 provides power to the fans and controller 90. In one or more other embodiments, controller 90 controls contactor 119 to be open under this condition, so that 12 VDC charger 107 also powers house loads 115 and battery 114. If the driver ignition switch 127 is deactivated, thereby deactivating engine 26 and alternator 106, and there is no connection to shore power at 122, contactors 102, 111, 113, and 119 are open, though in one or more embodiments contactors 111 and 119 may be closed to provide continued power to controller 90.

Many modifications and other embodiments of the inventions set forth herein will come to mind to one skilled in the art to which these inventions pertain having the benefit of the teachings presented in the foregoing descriptions and the associated drawings. Thus, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments but not necessary all example embodiments. Thus, any advantages, benefits, or solutions described herein should not be thought of as being critical, required, or essential to all embodiments or to that which is claimed herein. Although specific terms are employed herein, they may be used in a generic and descriptive sense only and not for purposes of limitation.

The invention claimed is:

1. A refrigerated cargo vehicle, comprising:
a chassis and body assembly defining an engine compartment and a cargo enclosure;

a plurality of wheels attached to the chassis and body assembly at a forward end thereof;
a plurality of wheels attached to the chassis and body assembly at a rearward end thereof;
an engine mounted to the chassis and body assembly at the engine compartment;
an alternator operatively connected to the engine so that the alternator outputs first electric current when the alternator is driven by the engine;
a refrigeration system, the refrigeration system comprising:
a refrigerant path;
a compressor mounted on the chassis and body assembly and located in the refrigerant path and configured to pump refrigerant located in the refrigerant path so that the refrigerant flows through the refrigerant path;
a condenser mounted in the chassis and body assembly and located in the refrigerant path;
a first fan disposed on the chassis and body assembly with respect to the condenser to move first air in a first air flow across the condenser so that the condenser transfers heat to the first air from refrigerant in the refrigerant path that moves through the condenser;
an evaporator mounted on the chassis and body assembly and located in the refrigerant path;
a second fan disposed on the chassis and body assembly with respect to the evaporator to move second air in a second air flow across the evaporator so that the evaporator transfers heat from the second air to the refrigerant in the refrigerant path that moves through the evaporator and so that the second air flows in the cargo enclosure from the evaporator; and
a first DC-to-DC power converter disposed electrically between the alternator and the compressor so that the first DC-to-DC power converter receives the first electric current from the alternator at a first electric potential and outputs second electric current to the compressor and wherein the first DC-to-DC power converter is configured to output the second electric current at a second electric potential higher than the first electric potential; and
a control system configured to operate the refrigeration system, wherein the control system comprises one or more controllers and computer-executable instructions that, when executed by the one or more controllers, cause the refrigeration system to supply conditioned air at a temperature between −10° F. and 45° F. at an ambient temperature of the refrigerated cargo vehicle when the engine is at idle solely based on the first electric current generated by the alternator and received at the first DC-to-DC power converter.

2. The refrigerated cargo vehicle as in claim 1, wherein
the alternator is configured to output, when driven by the engine, the first electric current at an electric potential in the range of about 12 VDC to about 14 VDC,
the compressor has a voltage rating that is greater than 14 VDC and less than 50 VDC, and
the second electric potential is at least as high as the compressor voltage rating.

3. The refrigerated cargo vehicle as in claim 1, wherein the first DC-to-DC power converter is a solid state switched mode power supply.

4. The refrigerated cargo vehicle as in claim 3, wherein the first DC-to-DC power converter has an electrical efficiency of at least 85% and a permanent magnet motor of the compressor has an electrical efficiency of at least 85%.

5. The refrigerated cargo vehicle as in claim 1, comprising an AC-to-DC power supply mounted on the chassis and body assembly and having an input terminal configured to connect to an AC power source that is independent of the refrigerated cargo vehicle and an output of electric current electrically connected to an input of the first DC-to-DC power converter so that the AC-to-DC power supply provides electric current to the first DC-to-DC power converter.

6. The refrigerated cargo vehicle as in claim 1, comprising a battery mounted on the chassis and body assembly and having an output of fourth electric current at an electric potential that is approximately at or below the first electric potential, wherein the battery is electrically connected to an input of the first DC-to-DC power converter so that the battery outputs the fourth electric current to the first DC-to-DC power converter.

7. The refrigerated cargo vehicle as in claim 1, comprising a battery mounted on the chassis and body assembly, wherein the battery is connected to an electrical output of at least one solar panel mounted on a roof of the refrigerated cargo vehicle and is electrically connected to an input of the first DC-to-DC power converter so that the battery provides electric current to the first DC-to-DC power converter.

8. The refrigerated cargo vehicle as in claim 1, wherein each of the first fan and the second fan has a voltage rating of about 12 VDC, and wherein the first DC-to-DC power converter is not disposed electrically between the alternator and either of the first fan or the second fan, such that each of the first fan and the second fan receive the first electric current from the alternator.

9. The refrigerated cargo vehicle as in claim 1, wherein the control system is configured to control the compressor of the refrigeration system to operate at a reduced capacity if the control system detects a low output voltage at a battery of the refrigerated cargo vehicle.

10. A refrigerated cargo vehicle, comprising:

a chassis and body assembly defining an engine compartment and a cargo enclosure;

a plurality of wheels attached to the chassis and body assembly at a forward end thereof;

a plurality of wheels attached to the chassis and body assembly at a rearward end thereof;

an engine mounted to the chassis and body assembly at the engine compartment;

an alternator operatively connected to the engine so that the alternator outputs first electric current at an electric potential in the range of about 12 VDC to about 14 VDC when the alternator is driven by the engine;

a refrigeration system, the refrigeration system comprising:

a refrigerant path;

a rotary compressor with a permanent magnet motor having a voltage rating that is greater than 14 VDC and less than 50 VDC mounted on the chassis and body assembly and located in the refrigerant path and configured to pump refrigerant located in the refrigerant path so that the refrigerant flows through the refrigerant path;

a condenser mounted in the chassis and body assembly and located in the refrigerant path;

a first fan disposed on the chassis and body assembly with respect to the condenser to move first air in a first air flow across the condenser so that the condenser transfers heat to the first air from refrigerant in the refrigerant path that moves through the condenser;

an evaporator mounted on the chassis and body assembly and located in the refrigerant path;

a second fan disposed on the chassis and body assembly with respect to the evaporator to move second air in a second air flow across the evaporator so that the evaporator transfers heat from the second air to the refrigerant in the refrigerant path that moves through the evaporator and so that the second air flows in the cargo enclosure from the evaporator; and a first DC-to-DC power converter comprising a solid state switched mode power supply disposed electrically between the alternator and the compressor so that the first DC-to-DC power converter receives the first electric current from the alternator at a first electric potential and outputs second electric current to the compressor and wherein the first DC-to-DC power converter is configured to output the second electric current at a second electric potential that is higher than the first electric potential and at least as high as the voltage rating of the compressor, and a control system configured to operate the refrigeration system, wherein the control system comprises one or more controllers and computer-executable instructions that, when executed by the one or more controllers, cause the refrigeration system to provide conditioned air at a temperature between −10° F. and 45° F. at an ambient temperature of the refrigerated cargo vehicle when the engine is at idle solely based on the first electric current generated by the alternator and received at the first DC-to-DC power converter.

11. The refrigerated cargo vehicle as in claim 10, wherein the first DC-to-DC power converter has an electrical efficiency of at least 85% and the permanent magnet motor has an electrical efficiency of at least 85%.

12. The refrigerated cargo vehicle as in claim 10, comprising an AC-to-DC power supply mounted on the chassis and body assembly and having an input terminal configured to connect to an AC power source that is independent of the refrigerated cargo vehicle and an output of electric current electrically connected to an input of the first DC-to-DC power converter so that the AC-to-DC power supply provides electric current to the first DC-to-DC power converter.

13. The refrigerated cargo vehicle as in claim 10, comprising a battery mounted on the chassis and body assembly and having an output of fourth electric current at an electric potential that is approximately at or below the first electric potential, wherein the battery is electrically connected to an input of the first DC-to-DC power converter so that the battery outputs the fourth electric current to the first DC-to-DC power converter.

14. The refrigerated cargo vehicle as in claim 10, comprising a battery mounted on the chassis and body assembly, wherein the battery is connected to an electrical output of at least one solar panel mounted on a roof of the refrigerated cargo vehicle and is electrically connected to an input of the first DC-to-DC power converter so that the battery provides electric current to the first DC-to-DC power converter.

15. The refrigerated cargo vehicle as in claim 10, wherein each of the first fan and the second fan has a voltage rating of about 12 VDC, and wherein the first DC-to-DC power converter is not disposed electrically between the alternator and either of the first fan or the second fan, such that each of the first fan and the second fan receive the first electric current from the alternator.

16. The refrigerated cargo vehicle as in claim 10, wherein the control system is configured to control the rotary compressor of the refrigeration system to operate at a reduced capacity if the control system detects a low output voltage at a battery of the refrigerated cargo vehicle.

\* \* \* \* \*